(12) United States Patent
Salem et al.

(10) Patent No.: US 11,711,171 B2
(45) Date of Patent: Jul. 25, 2023

(54) SYSTEM AND METHOD FOR RELIABLE TRANSMISSION OVER NETWORK RESOURCES

(71) Applicant: Huawei Technologies Co., Ltd., Shenzhen (CN)

(72) Inventors: Mohamed Adel Salem, Kanata (CA); Jiayin Zhang, Kanata (CA); Toufiqul Islam, Ottawa (CA); Zhenfei Tang, Ottawa (CA); Amine Maaref, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 16/231,006

(22) Filed: Dec. 21, 2018

(65) Prior Publication Data
US 2019/0215104 A1   Jul. 11, 2019

Related U.S. Application Data

(60) Provisional application No. 62/616,390, filed on Jan. 11, 2018.

(51) Int. Cl.
*H04L 1/1812* (2023.01)
*H04L 5/00* (2006.01)
(Continued)

(52) U.S. Cl.
CPC .......... *H04L 1/1819* (2013.01); *H04L 5/0055* (2013.01); *H04W 72/23* (2023.01); *H04W 80/02* (2013.01)

(58) Field of Classification Search
None
See application file for complete search history.

(56) References Cited

U.S. PATENT DOCUMENTS 8,102,805 B2 * 1/2012 Goransson ........ H04W 72/1284
                                                    370/329
8,307,250 B2 * 11/2012 Cai ..................... H04W 72/044
                                                    714/748
(Continued)

FOREIGN PATENT DOCUMENTS

CN     101106439 A     1/2008
CN     102299780 A    12/2011
(Continued)

OTHER PUBLICATIONS

Nokia et al., "UL grant-free HARQ operation for URLLC," 3GPP TSG-RAN WG1#89, R1-1708525, Agenda Item 7.1.3.3.2, Hangzhou, China, May 15-19, 2017, 5 pages.
(Continued)

*Primary Examiner* — Gregory B Sefcheck
(74) *Attorney, Agent, or Firm* — Slater Matsil, LLP

(57) ABSTRACT

A method includes receiving a first assignment for a first transmission with a first hybrid automatic repeat request (HARQ) process identifier (process ID) in a first network resource, receiving a second assignment for a second transmission with a second HARQ process ID in a second network resource, wherein the first network resource and the second network resource differ in a domain other than a time domain, detecting an indication indicating that the first HARQ process ID and the second HARQ process ID map to a same transmission block (TB), and communicating with an access node, a transmission associated with at least one of the first HARQ process ID or the second HARQ process ID.

34 Claims, 19 Drawing Sheets

(51) Int. Cl.
*H04W 72/23* (2023.01)
*H04W 80/02* (2009.01)

(56) References Cited

U.S. PATENT DOCUMENTS

| | | | | |
|---|---|---|---|---|
| 8,312,338 B2* | 11/2012 | Seok | ............... | H04L 1/1822 |
| | | | | 714/748 |
| 8,320,341 B2* | 11/2012 | Malkamaki | ........... | H04L 1/1854 |
| | | | | 370/336 |
| 8,325,650 B2* | 12/2012 | Hu | ................ | H04L 1/1845 |
| | | | | 370/328 |
| 8,386,872 B2* | 2/2013 | Wang | ................ | A61P 25/00 |
| | | | | 714/749 |
| 8,429,477 B2* | 4/2013 | Cai | ................ | H04W 72/044 |
| | | | | 714/748 |
| 8,498,246 B2* | 7/2013 | Goransson | ........... | H04B 7/0697 |
| | | | | 370/328 |
| 8,509,319 B2* | 8/2013 | Brown | ................ | H04L 1/1887 |
| | | | | 375/257 |
| 8,576,792 B2* | 11/2013 | Kim | ................ | H04L 1/1819 |
| | | | | 370/329 |
| 8,612,818 B2* | 12/2013 | Cai | ................ | H04W 72/044 |
| | | | | 714/748 |
| 8,817,734 B2* | 8/2014 | Khoryaev | ........... | H04L 12/2854 |
| | | | | 370/329 |
| 8,867,442 B2* | 10/2014 | Pelletier | .............. | H04W 36/026 |
| | | | | 370/328 |
| 9,191,180 B2* | 11/2015 | Seo | ................ | H04L 5/0055 |
| 9,197,376 B2* | 11/2015 | Verma | ................ | H04L 1/1812 |
| 9,225,481 B2* | 12/2015 | Damnjanovic | ........ | H04L 5/003 |
| 9,325,397 B2* | 4/2016 | Jonsson | .............. | H04L 1/0026 |
| 9,350,512 B2* | 5/2016 | Lin | ................ | H04L 1/1671 |
| 9,356,750 B2* | 5/2016 | Pelletier | ........... | H04W 72/1289 |
| 9,391,758 B2* | 7/2016 | Kim | ................ | H04W 56/0045 |
| 9,392,616 B2* | 7/2016 | Goransson | .......... | H04L 1/1896 |
| 9,397,735 B2* | 7/2016 | Nammi | ............... | H04B 7/0417 |
| 9,504,037 B2* | 11/2016 | Yi | ................ | H04L 5/0016 |
| 9,565,701 B2* | 2/2017 | Quan | ................ | H04W 72/042 |
| 9,635,644 B2* | 4/2017 | Chen | ................ | H04W 72/04 |
| 9,762,356 B2* | 9/2017 | Rudolf | .............. | H04L 1/1887 |
| 9,794,926 B2* | 10/2017 | Park | ................ | H04L 1/1896 |
| 9,853,780 B2* | 12/2017 | Tyrrell | ................ | H04L 1/18 |
| 9,866,353 B2* | 1/2018 | Goransson | ............. | H04L 1/1887 |
| 9,893,865 B2* | 2/2018 | Hsieh | ................ | H04L 1/1874 |
| 9,913,270 B2* | 3/2018 | Pelletier | ........... | H04W 72/1289 |
| 9,917,676 B2* | 3/2018 | Ng | ................ | H04L 1/1887 |
| 9,924,536 B2* | 3/2018 | Seo | ................ | H04L 5/00 |
| 9,930,684 B2* | 3/2018 | Hwang | ................ | H04L 1/1822 |
| 10,050,688 B2* | 8/2018 | Nammi | ................ | H04J 11/0023 |
| 10,057,018 B2* | 8/2018 | Lin | ................ | H04W 76/28 |
| 10,219,180 B2* | 2/2019 | Yang | ................ | H04W 28/0215 |
| 10,219,266 B2* | 2/2019 | Suzuki | ............... | H04L 1/18 |
| 10,219,295 B2* | 2/2019 | Hugl | ................ | H04L 5/0057 |
| 10,326,563 B2* | 6/2019 | Goransson | ........ | H04W 72/1284 |
| 10,361,809 B2* | 7/2019 | Dinan | ................ | H04L 1/1822 |
| 10,362,626 B2* | 7/2019 | Tseng | ................ | H04L 1/1883 |
| 10,397,948 B2* | 8/2019 | Li | .................... | H04W 72/1284 |
| 10,404,418 B2* | 9/2019 | Wu | .................... | H04L 1/1861 |
| 10,419,168 B2* | 9/2019 | Seo | .................... | H04B 7/15557 |
| 10,454,632 B2* | 10/2019 | Li | ........................ | H04L 1/1812 |
| 10,524,237 B2* | 12/2019 | Nam | .................... | H04L 5/0053 |
| 10,693,592 B2* | 6/2020 | Ko | ........................ | H04W 72/12 |
| 10,798,684 B2* | 10/2020 | Marinier | ............. | H04W 52/146 |
| 11,018,810 B2* | 5/2021 | Fan | ...................... | H04L 1/1867 |
| 11,050,521 B2* | 6/2021 | Wong | ................... | H04L 5/0055 |
| 11,134,451 B2* | 9/2021 | Ouchi | ................. | H04W 52/245 |
| 11,303,416 B2* | 4/2022 | Lei | ........................ | H04L 1/1854 |
| 2009/0319850 A1* | 12/2009 | Baek | ................... | H04L 1/1874 |
| | | | | 714/748 |
| 2013/0223307 A1* | 8/2013 | Ohlsson | ................ | H04W 56/00 |
| | | | | 370/311 |
| 2014/0029459 A1* | 1/2014 | Kwon | ................... | H04W 76/28 |
| | | | | 370/252 |
| 2014/0086175 A1* | 3/2014 | Hakola | ................ | H04L 1/1887 |
| | | | | 370/329 |
| 2015/0173102 A1* | 6/2015 | Ruiz Delgado | ........... | H04L 5/14 |
| | | | | 370/280 |
| 2015/0305000 A1* | 10/2015 | Nguyen | ................ | H04L 1/1822 |
| | | | | 370/329 |
| 2016/0182204 A1* | 6/2016 | Hsieh | ................... | H04L 1/1893 |
| | | | | 370/329 |
| 2017/0223674 A1* | 8/2017 | Dinan | ................... | H04L 1/1861 |
| 2017/0272200 A1 | 9/2017 | Dinan | | |
| 2017/0311201 A1 | 10/2017 | Uchino et al. | | |
| 2017/0373803 A1 | 12/2017 | Wu | | |
| 2018/0006791 A1 | 1/2018 | Marinier et al. | | |
| 2018/0176945 A1* | 6/2018 | Cao | ........................ | H04L 1/1864 |
| 2020/0059330 A1* | 2/2020 | Wong | ................... | H04L 1/1896 |
| 2020/0236574 A1* | 7/2020 | Ohuchi | ................. | H04B 7/0626 |
| 2021/0136830 A1* | 5/2021 | Lin | .................... | H04W 72/1289 |
| 2021/0219322 A1* | 7/2021 | Chin | ................... | H04W 72/1284 |

FOREIGN PATENT DOCUMENTS

| | | |
|---|---|---|
| CN | 104734821 A | 6/2015 |
| CN | 105790897 A | 7/2016 |
| CN | 107027180 A | 8/2017 |
| CN | 107409014 A | 11/2017 |
| WO | 2011038631 A1 | 4/2011 |
| WO | 2018171242 A1 | 9/2018 |

OTHER PUBLICATIONS

Huawei et al., "On multiple resource configuration for UL grant-free transmission", 3GPP TSG RAN WG1 NR Ad-Hoc #3, R1-1715420, Sep. 18-21, 2017, 6 Pages, Nagoya, Japan.

Nec, "Remaining issues on UL transmission without grant", 3GPP TSG RAN WG1 Meeting #91, R1-1720382, Nov. 27-Dec. 1, 2017, 5 Pages, Reno, Nevada.

Vivo, "UL data transmission procedure", 3GPP TSG RAN WG1 Meeting 90bis, R1-1717500, Oct. 9-13, 2017, 13 Pages, Prague, CZ.

* cited by examiner

| | \multicolumn{6}{c}{PRE-CONFIGURED AUX-HARQ IDS CCY} |
| | 0 | 1 | 2 | . | N-2 | N-1 |
|---|---|---|---|---|---|---|
| 0 | - | J | | . | K | |
| 1 | | - | K | . | | J |
| . | | | | - | . | |
| N-1 | J | | | . | K | - |

SYSTEM AND METHOD FOR RELIABLE TRANSMISSION OVER NETWORK RESOURCES

This application claims the benefit of U.S. Provisional Application No. 62/616,390, filed on Jan. 11, 2018, entitled "Systems and Methods for Reliable Transmission Over a Carrier Group," which application is hereby incorporated herein by reference in its entirety.

TECHNICAL FIELD

The present disclosure relates to systems and methods for reliable transmission over network resources.

BACKGROUND

Existing technologies such as multi-antenna, repetition/slot aggregation, low modulation and coding scheme (MCS), and hybrid automatic repeat request (HARQ) procedures have been considered as possible ways to enhance reliability or diversity. However, these approaches are conventionally performed within a single carrier. Drawbacks of single carrier implementations include:

difficult to ensure reliable quality of service (QoS) in a band-limited carrier, time-domain repetition or multiple HARQ transmission may increase latency;

difficult to ensure reliability when user equipment (UE) loading is high in a given carrier, where UEs receive/transmit critical communications with low latency;

difficult to exploit frequency diversity (in a band-limited carrier) when during an interval, critical common signaling such as synchronization sequence block (SSB) are transmitted; co-located multiple-input multiple-output (MIMO) may suffer from correlated fading; and HARQ retransmissions may not be feasible for several slots or subframes on an unlicensed component carrier (CC) due to the activity of coexisting nodes/systems in proximity.

Carrier domain can be exploited for flexible and efficient resource sharing for data duplication. This can be performed across frequency division duplex (FDD) carriers, time division duplex (TDD) carriers, unlicensed carriers, high frequency/low frequency carriers. Two existing frameworks for carrier domain resource sharing, where multiple carriers are used for communication between the network and a UE, include dual-connectivity and carrier aggregation.

In the dual-connectivity framework, there is a different media access control (MAC) entity for each carrier group. Transport block (TB) scheduling for a UE is performed independently on the each carrier group. The carrier aggregation framework has one MAC entity for all carriers, but TBs are still scheduled separately/independently on the multiple carriers. The carrier aggregation framework may be used to enhance data rate. With the carrier aggregation framework, the MAC entity schedules independent HARQ processes on each carrier.

Data duplication at the packet data convergence protocol (PDCP) layer can be performed to produce multiple TBs from one TB for transmission on separate carriers, but the multiple TBs then pass through the separate MAC entities (for dual-connectivity) or a single MAC entity (carrier aggregation) and are scheduled independently in both cases. The UE treats the received TBs independently. TB retransmissions are scheduled on the same carrier as original data TB transmissions.

The protocol stack for legacy carrier aggregation is depicted in FIG. 1, and is based on single MAC with separate HARQ entities per component carrier. A HARQ entity is the combination of the HARQ transmit/receive buffers of the associated HARQ processes handled by the HARQ entity, and their corresponding HARQ state machines.

If the same TB (more generally the same TB or different redundancy versions of the same TB) is repeated in another component carrier, the UE needs to identify that to be the case. The protocol stack in FIG. 1 includes a radio link control (RLC) layer 100, MAC layer 102, and physical (PHY) layer 104. The RLC layer 100 includes multiple RLC entities 110,112,114 that receive TBs from the PDCP layer (not shown). In the MAC layer 102, multiplexing 116 takes place, and then separate HARQ entities 118,120 generate TBs for each of two component carriers CC1, CC2 in the PHY layer 104.

In some systems, transmissions are performed on component carriers in unlicensed spectrum, e.g., in New Radio (NR)-Unlicensed (NR-U) using CA,DC, or stand-alone (SA) modes). In such systems, the gnodeB (gNB)/UE may not be able to gain medium access on the original band to perform the HARQ retransmission for several slots or subframes due to the failure of the regulatory-required listen-before-talk (LBT) procedure. Furthermore, wide-band transmissions, e.g., carrier-wide transmissions, are desired in NR-U to shorten the channel occupancy time and to decrease the power spectral density, whereas LBT failure can be caused by a full or partial occupancy of the LBT bandwidth by the coexisting nodes/systems.

With asynchronous HARQ, a retransmission might not occur for several slots or subframes due to a blocked or lost acknowledgement (ACK)/negative acknowledgement (NACK) feedback transmission as a result of LBT failure or persistent collisions with the transmissions of hidden nodes on that unlicensed component carrier.

Moreover, the receiving end RLC layer will not request a retransmission of the associated SDU from the sending end RLC layer unless a subsequent SDU has been received and a reordering timer has been started and elapsed. The sending end RLC then triggers the retransmission of the SDU and new associated TBs are created and scheduled at the MAC entity, possibly on a different component carrier.

Significant delays and throughput reduction can be incurred with such a design in unlicensed spectrum. There is a need for efficient LBT-resilient mechanisms for performing the HARQ retransmissions and transmission of the associated ACK/NACK feedback on a PUCCH in unlicensed spectrum.

SUMMARY

Example embodiments provide systems and methods for reliable transmission over a network resource.

In accordance with an example embodiment, a computer-implemented method is provided. The computer-implemented method includes receiving, by a user equipment (UE), a first assignment for a first transmission with a first hybrid automatic repeat request (HARQ) process identifier (process ID) in a first network resource, receiving, by the UE, a second assignment for a second transmission with a second HARQ process ID in a second network resource, wherein the first network resource and the second network resource differ in a domain other than a time domain, detecting, by the UE, an indication indicating that the first HARQ process ID and the second HARQ process ID map to a same transmission block (TB), and communicating, by the UE, with an access node, a transmission associated with at least one of the first HARQ process ID or the second HARQ process ID.

Optionally, in any of the preceding embodiments, an embodiment wherein communicating the transmission comprises receiving, by the UE, the transmission from the access node.

Optionally, in any of the preceding embodiments, an embodiment wherein communicating the transmission comprises transmitting, by the UE, the transmission to the access node.

Optionally, in any of the preceding embodiments, an embodiment wherein the first network resource and the second network resource include at least one of a frequency resource, a time-frequency resource, a code resource, a spatial resource, a carrier, a component carrier, a cell, or a bandwidth part (BWP).

Optionally, in any of the preceding embodiments, an embodiment wherein the first network resource and the second network resource are associated with different transmission/receiving points (TRP).

Optionally, in any of the preceding embodiments, an embodiment wherein the first HARQ process ID and the second HARQ process ID are the same.

Optionally, in any of the preceding embodiments, an embodiment wherein the indication is a semi-static configuration.

Optionally, in any of the preceding embodiments, an embodiment wherein the indication is a combination of a semi-static configuration and dynamic signaling.

Optionally, in any of the preceding embodiments, an embodiment wherein the indication comprises:

an indication indicating that a pool of HARQ process IDs are common across at least the first and second network resources, wherein the first HARQ process ID and the second HARQ process ID are the same to indicate that the first and second HARQ process IDs map to the TB.

Optionally, in any of the preceding embodiments, an embodiment wherein the indication comprises an indication indicating that a subset of a pool of HARQ process IDs are common across at least the first and second network resources, wherein the first HARQ process ID and the second HARQ process ID are the same and belong to the subset to indicate that the first and second HARQ process IDs map to the TB.

Optionally, in any of the preceding embodiments, an embodiment wherein the indication comprises an indication indicating that a subset of a pool of HARQ process IDs are common across a subset of a set of network resources, wherein the first and second HARQ process IDs are the same and belong to the subset of the pool and the first and second network resources belong to the subset of the set of network resources to indicate that the first and second HARQ process IDs map to the TB.

Optionally, in any of the preceding embodiments, an embodiment wherein the indication comprises a field in the second assignment indicating that the second assignment is in respect of a retransmission of the TB.

Optionally, in any of the preceding embodiments, an embodiment wherein the indication comprises a semi-static configuration that associates the second HARQ process ID with the first HARQ process ID, such that the first assignment including the first HARQ process ID, the second assignment including the second HARQ process ID, and the field in the second assignment together indicate that the first and second HARQ process IDs map to the TB.

Optionally, in any of the preceding embodiments, an embodiment wherein for the first assignment and the second assignment to be in respect of the same TB, the first assignment and the second assignment are received within a specified time window of one another.

Optionally, in any of the preceding embodiments, an embodiment wherein the specified time window is specified in terms of a number of time slots, mini-slots, subframes, or symbols.

Optionally, in any of the preceding embodiments, an embodiment wherein receiving the first assignment and the second assignment comprises receiving a single downlink control information (DCI).

Optionally, in any of the preceding embodiments, an embodiment wherein the indication comprises a first field in the first assignment indicating that there will be an assignment in respect to the TB on a different network resource, and a second field in the second assignment indicating that the second assignment is in respect to the TB transported on the different network resource.

Optionally, in any of the preceding embodiments, an embodiment wherein the indication further comprises at least one semi-statically configured mapping rule that associates the first HARQ process ID on the first network resource with the second HARQ process ID on the second network resource, and wherein the first assignment including the first field and the second assignment including the second field together indicate that the first and second assignments are in respect to the TB only when the first HARQ process ID is associated with the second HARQ process ID through the at least one mapping rule.

Optionally, in any of the preceding embodiments, an embodiment wherein communicating a transmission associated with at least one of the first HARQ process ID or the second HARQ process ID comprises receiving a first transmission associated with the first HARQ process ID on the first network resource and receiving a second transmission associated with the second HARQ process ID on the second network resource.

Optionally, in any of the preceding embodiments, an embodiment further comprising processing, by the UE, the first transmission to produce a first set of log likelihood ratios (LLRs), processing, by the UE, the second transmission to produce a second set of LLRs, combining, by the UE, the first set of LLRs and the second set of LLRs to produce a combined set of LLRs, and decoding, by the UE, the TB transmitted in the first transmission and the second transmission in accordance with the combined set of LLRs.

Optionally, in any of the preceding embodiments, an embodiment wherein the HARQ codebook configuration indicates an ACK/NACK resource for transmitting an ACK/NACK in respect to the TB or versions of the TB received over multiple network resources.

Optionally, in any of the preceding embodiments, an embodiment further comprising receiving a HARQ codebook configuration indicating acknowledgement/negative acknowledgment (ACK/NACK) resources used for transmitting an ACK/NACK in respect to the TB or versions of the TB received over multiple network resources.

Optionally, in any of the preceding embodiments, an embodiment further comprising transmitting, by the UE, ACK/NACK feedback only on the first network resource.

Optionally, in any of the preceding embodiments, an embodiment further comprising transmitting, by the UE, ACK/NACK feedback on the first network resource and the second network resource.

Optionally, in any of the preceding embodiments, an embodiment wherein the first network resource is an unlicensed network resource.

Optionally, in any of the preceding embodiments, an embodiment wherein the indication comprises at least one parameter upon which the UE determines whether a switch from the first HARQ process ID on the first network resource to the second HARQ process ID on the second network resource has occurred.

Optionally, in any of the preceding embodiments, an embodiment wherein the first assignment comprises a first TB size indicator indicating a size of the first TB and a first new data indicator (NDI), wherein the second assignment comprises a second indicator indicating the size of the second TB and a second NDI, wherein the first assignment and the second assignment indicate the same TB size, and wherein the first NDI and the second NDI are the same.

Optionally, in any of the preceding embodiments, an embodiment wherein the second assignment comprises an indicator indicating at least one of an identifier of the first network resource or the first HARQ process ID.

Optionally, in any of the preceding embodiments, an embodiment wherein the at least one parameter comprises a timeout value of a timer initialized by the UE after a HARQ round trip time (RTT) timer elapses from a last transmission in respect to the TB on the first network resource, such that the timer elapsing indicates a subsequent transmission in respect to the TB will occur on a different network resource.

Optionally, in any of the preceding embodiments, an embodiment wherein the RTT timer elapsing further indicates to the UE to trigger the access node to send the second assignment for the transmission of the TB with the second HARQ process ID in the second network resource.

Optionally, in any of the preceding embodiments, an embodiment wherein the indication further comprises at least one mapping, rule, or parameter in respect to a rule that associates the second HARQ process ID with the first HARQ process ID.

Optionally, in any of the preceding embodiments, an embodiment wherein the indication further comprises a semi-statically configured association between the first HARQ process ID and the second HARQ process ID.

Optionally, in any of the preceding embodiments, an embodiment wherein the indication comprises an index offset indicating a binary index offset between the first and second HARQ process IDs.

Optionally, in any of the preceding embodiments, an embodiment wherein the indication comprises a number of binary shifts between the first and second HARQ process IDs.

Optionally, in any of the preceding embodiments, an embodiment wherein the indication comprises an index indicating a binary offset and a number of binary shifts that together associate the second HARQ process ID with the first HARQ process ID.

Optionally, in any of the preceding embodiments, an embodiment wherein the indication comprises an index indicating a number of binary shifts, and wherein a binary offset and the number of binary shifts together associate the second HARQ process ID with the first HARQ process ID.

Optionally, in any of the preceding embodiments, an embodiment wherein the indication comprises an index indicating a binary offset and a number of binary shifts that together with a semi-statically configured rule or formula associate the second HARQ process ID with the first HARQ process ID.

In accordance with an example embodiment, a computer-implemented method is provided. The computer-implemented method includes receiving, by a UE, a first assignment for a first transmission with a first HARQ process identifier (process ID) in a first network resource, receiving, by the UE, a second assignment for a second transmission with a second HARQ process ID in a second network resource, wherein the first HARQ process ID differs from the second HARQ process ID, detecting, by the UE, an indication indicating that the first HARQ process ID and the second HARQ process ID map to a same TB, and communicating, by the UE, with an access node, a transmission associated with at least one of the first HARQ process ID or the second HARQ process ID.

In accordance with an example embodiment, a UE is provided. The UE includes a non-transitory memory storage comprising instructions, and one or more processors in communication with the memory storage. The one or more processors execute the instruction to receive a first assignment for a first transmission with a first HARQ process identifier (process ID) in a first network resource, receive a second assignment for a second transmission with a second HARQ process ID in a second network resource, wherein the first network resource and the second network resource differ in a domain other than a time domain, detect an indication indicating that the first HARQ process ID and the second HARQ process ID map to a same TB, and communicate, with an access node, a transmission associated with at least one of the first HARQ process ID or the second HARQ process ID.

In accordance with an example embodiment, a UE is provided. The UE includes a non-transitory memory storage comprising instructions, and one or more processors in communication with the memory storage. The one or more processors execute the instruction to receive a first assignment for a first transmission with a first HARQ process identifier (process ID) in a first network resource, receive a second assignment for a second transmission with a second HARQ process ID in a second network resource, wherein the first HARQ process ID differs from the second HARQ process ID, detect an indication indicating that the first HARQ process ID and the second HARQ process ID map to a same TB, and communicate, with an access node, a transmission associated with at least one of the first HARQ process ID or the second HARQ process ID.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
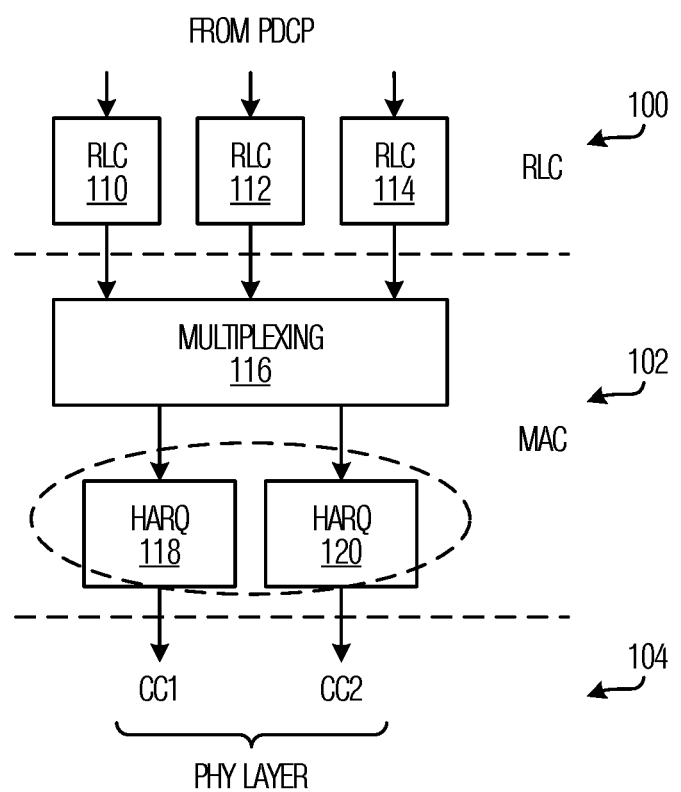
FIG. 1 depicts a block diagram of a protocol stack for legacy carrier aggregation.

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

This application describes solutions where UE receives an assignment comprising an indication when same transport block is duplicated or transmitted in more than one carrier. The UE can be semi-statically configured for data duplication mode. The assignment can be semi-statically provided to the UE such as configured ID of shared HARQ process across a carrier group or a subset of carrier group. Alternatively, the assignment can be provided to the UE as a combination of semi-static and dynamic signaling. In particular, indication can be provided in one or more of the scheduling downlink control information (DCIs) that schedule same transport block in different carriers. When provided in scheduling DCI, the indication may comprise one or more fields such as a flag for differentiation between duplication or independent scheduling, HARQ process ID of the other carrier(s) where data is duplicated, carrier index of the carrier(s) where data is duplicated. The indication may be provided in one or both of the scheduling DCIs in primary and secondary component carriers. Semi-static signaling may notify the UE which set of carriers can be used for data duplication or which set of HARQ process IDs can be used for duplication or what is the mapping between a HARQ process ID in one carrier to another HARQ process ID in a different carrier if data duplication is indicated. In another example, prior semi-static configuration may not be necessary, and duplication is indicated by dynamic signaling only, i.e., in the form of explicit and/or implicit indication in a DCI. Furthermore, a common HARQ feedback can be generated by the UE, if the UE is able to combine the packets and if the UE is configured for this process. The common HARQ feedback can be transmitted in the primary component carrier (PCC) and/or a secondary component carrier (SCC) uplink configured/indicated resource. Common HARQ feedback generation may require soft buffer data/log-likelihood ratio (LLR) sharing at the receiver.

Although the discussion focuses on carriers and carrier groups, a carrier is an example of a network resource and a carrier group is an example of a group of network resources. In general, a network resource is a resource of the network that is usable in the transmission of information. A network resource may be characterized as being a member one or more domains, where the domains include the time domain, the frequency domain, the code domain, a spatial domain, and so forth. Examples of network resources include time resources, frequency resources, code resources, spatial resources, time-frequency resources, carriers, component carriers, bandwidth parts, and so on.

As used herein, repetition of a transport block implies subsequent transmission of a transport block after initial transmission but before HARQ feedback, if any. Retransmission implies a subsequent transmission of a transport block after initial transmission is not correctly received. Below, data duplication is used in the context when the same transport block, or different redundancy versions of the same transport block, is transmitted over multiple carriers. Duplication may happen at the same or different time, in the form of a repetition or retransmission. The UE may or may not be able to do HARQ combining of the copies of a transport block transmitted over different carriers, depending on the hardware capability of the UE and/or timing of the transmissions in different carriers and/or indicated HARQ feedback timing.

Methods Using Pre-Configured Shared HARQ Process in a Carrier Group

In a first set of methods, HARQ process are shared across two or more carriers in a carrier group, and these shared HARQ process are pre-configured, for example, semi-statically using radio resource control (RRC) signaling on a per UE basis. Once the configuration is performed/notified to the UE, additional signalling (such as dynamic signalling in a DCI), on a per transmission basis, is not required to inform a UE of which HARQ Processes are shared and/or which component carriers are sharing on or more HARQ Process IDs.

Method 1A: Shared HARQ Process Across all Carriers in a Carrier Group

This method depends on configuring/associating a pool of HARQ process across carriers. Rather than having independent HARQ Process per carrier, a pool of K HARQ process are common across all carriers or across all carriers in a carrier group. With this approach, multiple HARQ entities share a pool of HARQ process. The pool of HARQ process may include all HARQ process, or a subset of all the HARQ processes.

A UE receiving indication of a given HARQ process ID from more than one carrier in the pool concludes that a same transmission or transport block is scheduled across the carriers for which indication is received. In some embodiments, indication of assignment of a HARQ process ID to a transmission or transport block may be provided in a scheduling DCI or physical downlink control channel (PDCCH). When PDCCH scheduling over different carriers in a group indicates a common HARQ process ID in the same slot/symbol(s)/interval or within a pre-configured/pre-defined period/duration of slots/symbols/intervals, the configured UE concludes that transmission of same packet is scheduled across the carriers.

A UE can be RRC configured with the association of a pool of HARQ process IDs and corresponding CC indices of component carriers that are to use the common pool of HARQ processes.

This approach is suitable for a UE that does not require a large number of HARQ processes supported across component carriers. The number of available HARQ processes does not scale with the number of component carriers, in the sense that adding a component carrier that uses a common set of HARQ processes with another component carrier or carriers does not increase the number of available HARQ processes.

Figure 2A:
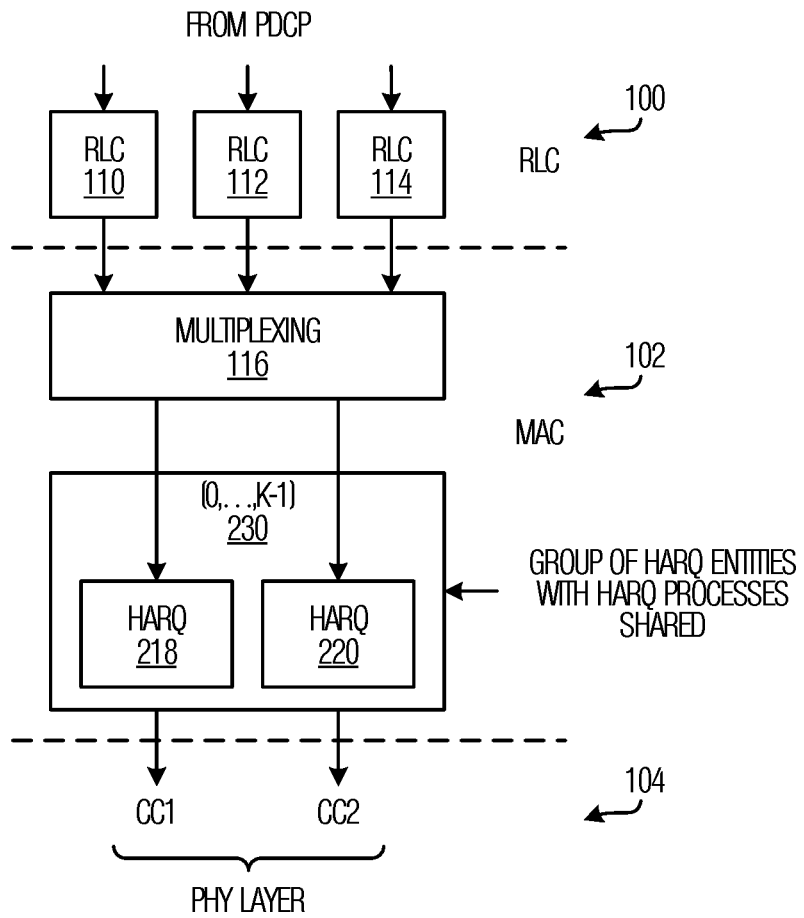
FIG. 2A depicts a block diagram of a protocol stack for carrier aggregation that shares HARQ process IDs across component carriers.

An example protocol stack is shown in FIG. 2A, which differs from FIG. 1 in that the MAC layer includes HARQ entities 218,220 for component carriers CC1,CC2 respectively that are part of a group of HARQ entities 230 that shares HARQ processes across component carriers. Note that HARQ entities that share HARQ processes may share soft buffer information.

Figure 2B:
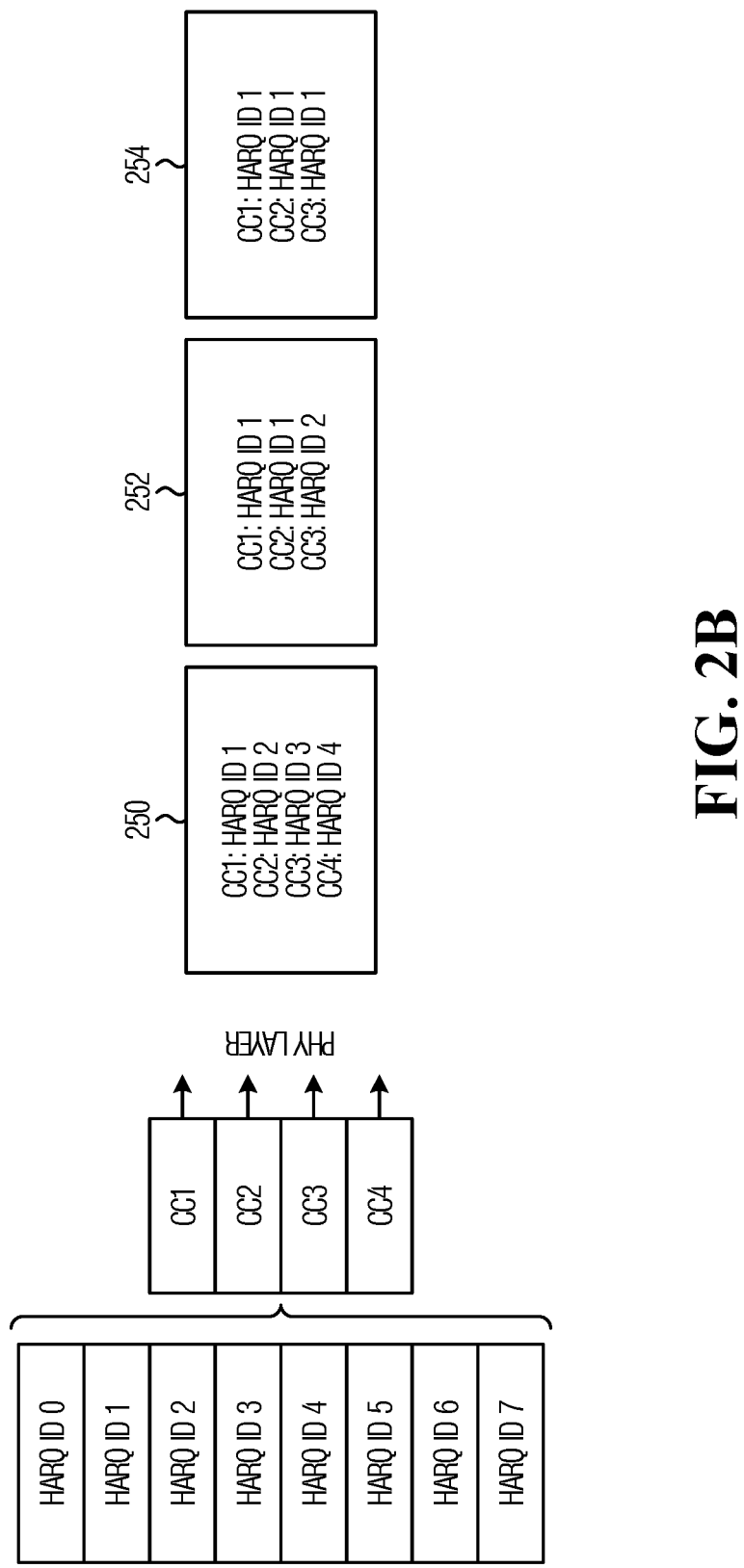
FIG. 2B depicts a block diagram of an example of shared HARQ process IDs across component carriers.

FIG. 2B shows a specific example of shared HARQ process, in which there are 8 HARQ process with HARQ ID 0, . . . , HARQ ID 7, that are shared between four component carriers CC1, . . . , CC4 configured for a UE.

A first example of TB transmission is indicated at 250, in which four TBs with different HARQ Process IDs are transmitted on the four carriers. These are independent TB transmissions.

A second example of TB transmission is indicated at 252, in which two TBs with the same HARQ ID 1 are transmitted on two carriers CC1,CC2. These are the same TB or redundancy versions of the same TB. An independent TB is transmitted on CC3.

A third example of TB transmission is indicated at 254, in which three TBs with the same HARQ ID 1 are transmitted on three carriers CC1,CC2,CC3. These are the same TB or redundancy versions of the same TB.

Method 1B: Shared HARQ Process in a Carrier Group for Some but not all Process

In a variant of method 1A, some HARQ process are shared across a set of component carriers, and other process are independently used in each component carrier.

Figures 3A, 14A:
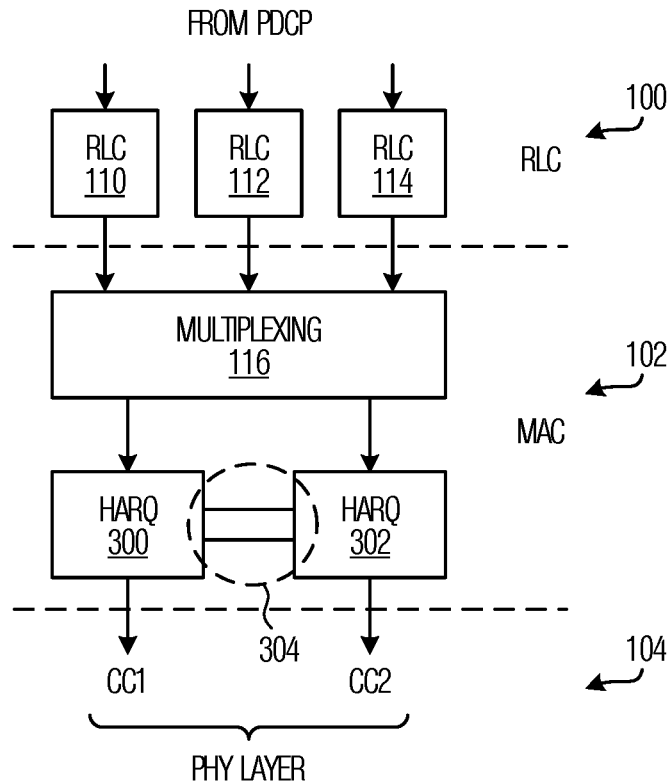
FIG. 3A depicts a block diagram of a protocol stack for carrier aggregation which includes a separate HARQ entity for each component carrier.
FIG. 14A depicts a table which maps a main HARQ Process ID to pre-configured auxiliary HARQ Process ID(s)

An example protocol stack is shown in FIG. 3A, which differs from FIG. 2A in that the MAC layer includes a separate HARQ entity 300,302 for each component carrier, but there is cooperation between the two HARQ entities 300,302 as indicated at 304, across component carriers.

In mathematical terms, where the maximum number of HARQ process per component carrier is K>=1, P HARQ processes are shared across the component carriers, where P<K. Duplication across component carriers uses the pool of P HARQ processes only. Which HARQ process are shared can be RRC configured for a UE.

Figure 3B:
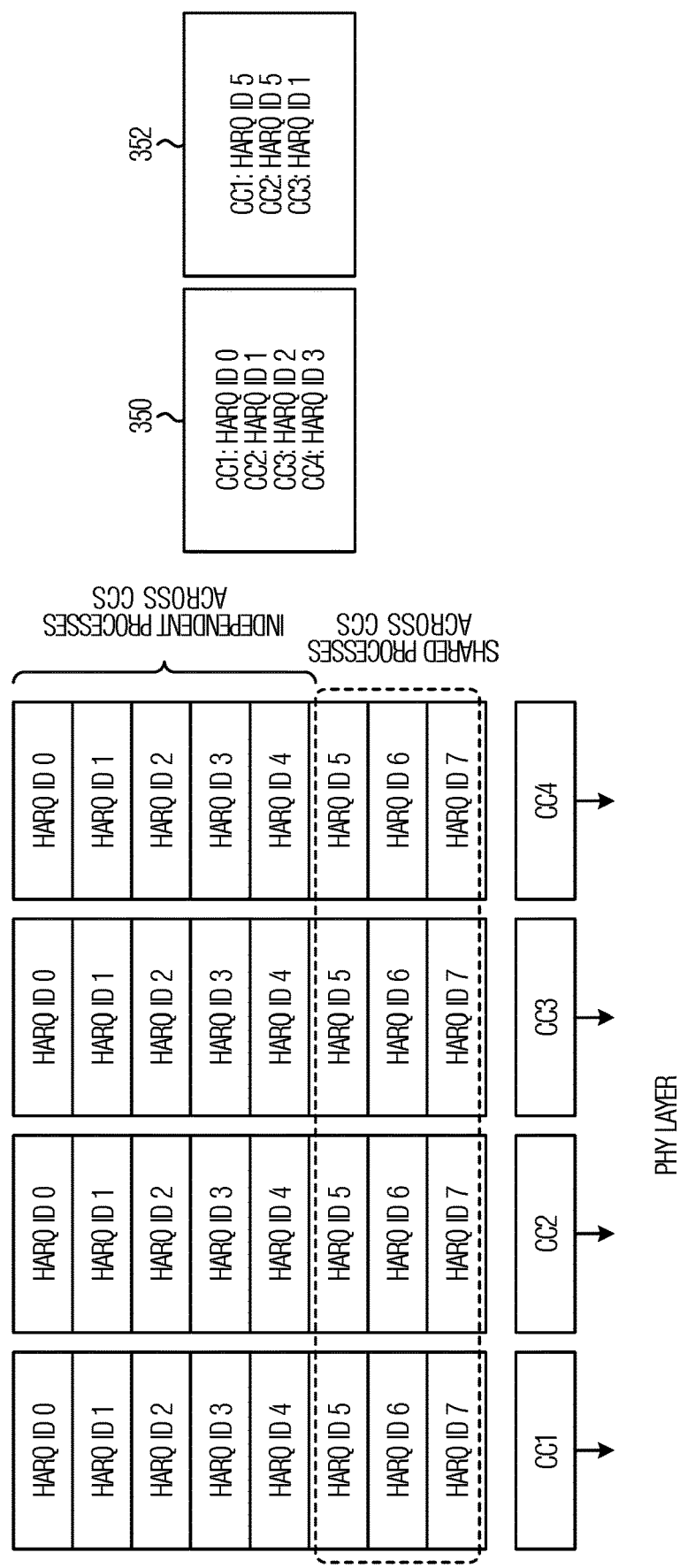
FIG. 3B depicts a block diagram of an example of shared and independent HARQ process IDs across 4 CCs.

An example is shown in FIG. 3B which shows 8 HARQ processes per cell. Of these, HARQ process with HARQ ID 0, . . . , HARQ ID 4 are independent for each of four component carriers CC1, . . . , CC4, and HARQ ID 5, . . . , HARQ ID 7 are shared across the four component carriers.

A first example of TB transmission is indicated at 350, in which four TBs with different HARQ Process IDs belonging to the set of independent HARQ Process are transmitted on the four carriers. These are independent TB transmissions.

A second example of TB transmission is indicated at 352, in which two TBs with the same HARQ ID 5 are transmitted on two carriers CC1,CC2. Because HARQ ID 5 is a shared process, these TBs are are duplicates in that one TB is a duplicate (i.e. repetition or retransmission, same or different redundancy version) of the other TB. An independent TB is transmitted on CC3.

Method 1C: Shared Process in a Subset of Carriers within a Carrier Group

In a variant of the above-described embodiments, HARQ process are shared across a subset of the component carriers in a carrier group. All of the HARQ process may be shared across the subset of component carriers (as per the example of FIG. 2A) or a subset of the HARQ Process may be shared across the subset of component carriers (as per the example of FIG. 3A).

Mathematically, this can be expressed as follows:

Maximum number of process per component carrier is $K=>1$;

$P<K$ processes are shared across $M<N$ component carriers, where N=total number of component carriers;

such that duplication across component carriers uses the pool of P processes over M component carriers only.

Figure 4:
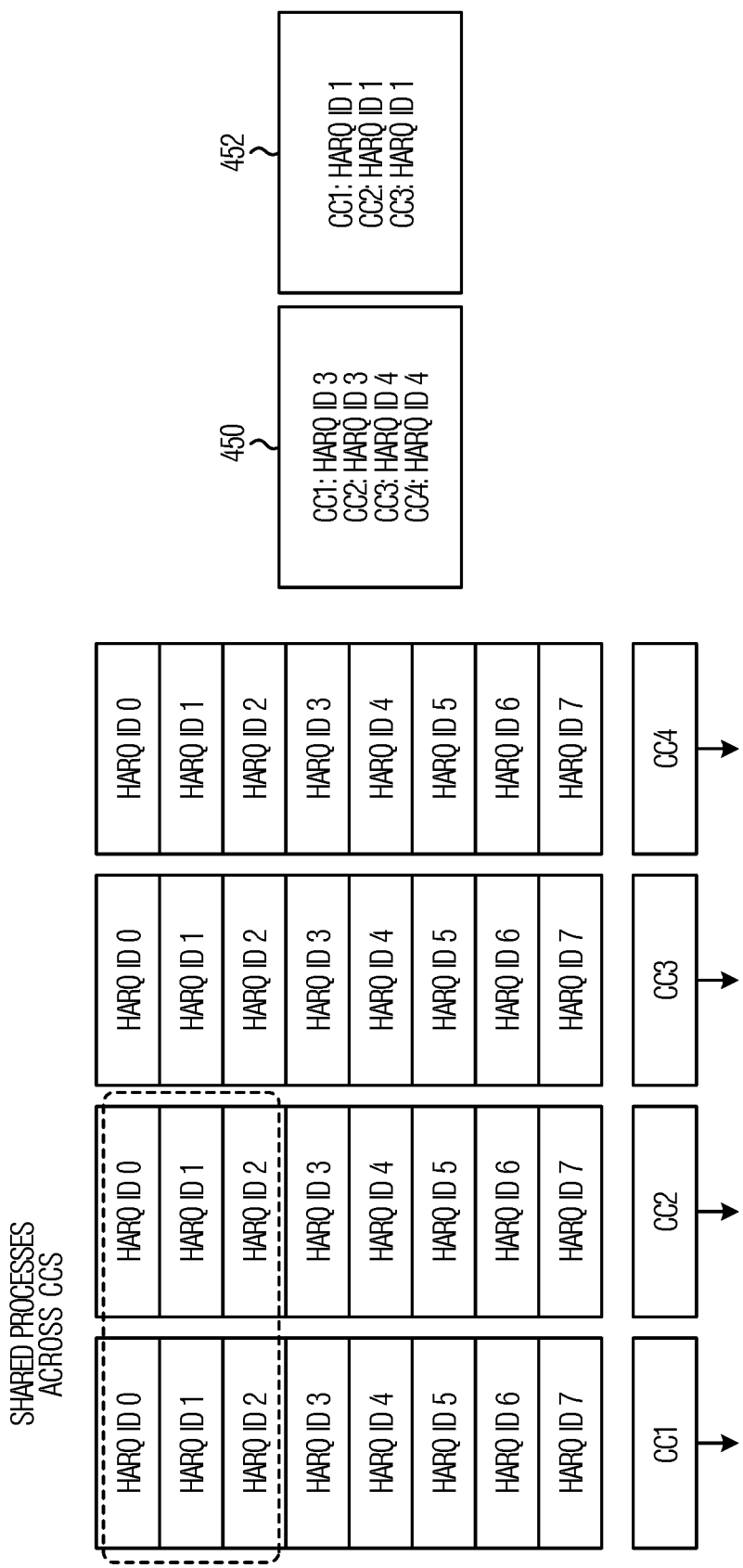
FIG. 4 depicts a block diagram of another example of shared and independent HARQ process IDs across 4 CCs.

A specific example is shown in FIG. 4 where there are K=8 HARQ process, P=3 shared HARQ Process, N=4 component carriers, and M=2 component carriers that use the shared HARQ Process IDs.

A first example of TB transmission is indicated at 450, in which two TBs with the same HARQ ID 3 are transmitted on two carriers CC1,CC2. Because HARQ ID 3 correspond to a shared process between CC1 and CC2, these transmissions are the same TB or different redundancy versions of the same TB. An independent TB is transmitted on CC3 using HARQ ID 4, and another independent TB is transmitted on CC4 also using HARQ ID 4.

A second example of TB transmission is indicated at 452, in which three TBs with the same HARQ ID 1 are transmitted on three carriers CC1,CC2,CC3. Because HARQ ID 1 correspond to a shared process between CC1 and CC2, the two transmissions on those carriers are the same TB or redundancy versions of the same TB. An independent TB is transmitted on CC3 using the same HARQ ID 1.

For the embodiments of FIGS. 2A,3A,4, configuration may be performed semi-statically, for example using radio resource control (RRC) signaling. This can involve signaling one or more of the following:

Indices of component carriers in a carrier group

Indication of which HARQ Process are shared

Indication of which component carriers share HARQ Processes.

Once the configuration is performed, additional signalling, on a per transmission basis, is not required to inform a UE of which HARQ Process are shared and/or which component carriers are sharing one or more HARQ Process. In some embodiments, a dynamic indication (for example in a DCI) is used to indicate which CCs of the pre-configured sharing carrier group are currently carrying duplications of the same TB.

Methods Using DCI-Based Indication of Mapped HARQ Process ID in a Carrier Group

In a second set of methods, HARQ process IDs are mapped, on a per transmission basis, across two or more carriers in a carrier group, and this is indicated to a UE in downlink control information (DCI) transmissions that schedule the TB transmissions using the shared HARQ Process. In some embodiments, as detailed below, DCI signaling indicates when the same or different HARQ process ID across different carriers are used for transmission of the same transport block or packet. In other words, HARQ process IDs in different carriers do not have to be the same for the same packet transmission/duplication/repetition/retransmission in the case of DCI based signaling. For the examples described below, DCI signaling can be conveyed in a scheduling DCI, for example PDCCH carrying a grant.

Method 2A: Use a Separate DCI on Each Component Carrier

In some embodiments, the DCI-based approach is a unified DCI solution which can support both data duplication and legacy TB scheduling in a carrier aggregation framework. These embodiments will be described in the context of two component carriers referred to herein as a PCC and a SCC but the approach can be generalized to any two or more component carriers generally on a single cell or multiple cells.

In this embodiment, separate HARQ processes are implemented for the two carriers. Consistent with a legacy carrier aggregation, in some embodiments, a default configuration is used, in which there is no shared HARQ processing. In other words, two TBs transmitted on the two carriers are independent, irrespective of the HARQ process IDs used on the two carriers which may be the same or different.

Figure 5:
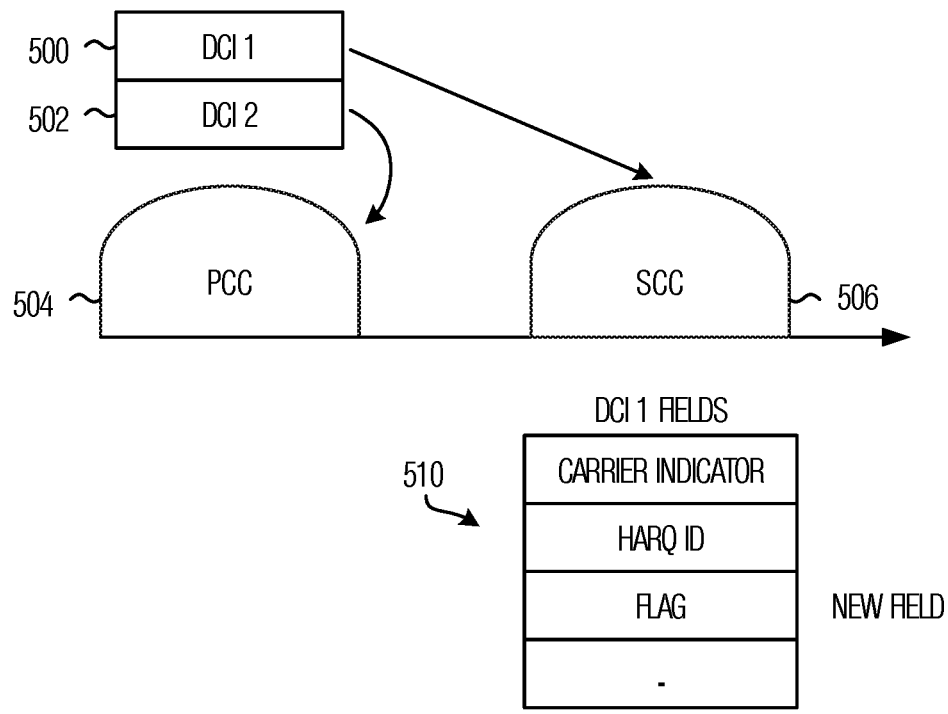
FIG. 5 depicts a block diagram of an example of DCI-based cross-carrier scheduling for two component carriers.

FIG. 5 shows an example of scheduling for two component carriers: DCI 2 502 indicates transmission scheduling for the PCC 504, and DCI 1500 indicates transmission scheduling for the SCC 506. HARQ Process IDs in DCI 1 and DCI 2 are independently mapped or correlated, with a relationship between the two DCIs indicated using a flag in a new field, as detailed below. The HARQ IDs for duplicate TB transmissions may be the same or different, and the same HARQ ID used on two CCs may relate to duplicate or independent TBs.

To achieve independent scheduling, DCI 1 and DCI 2 schedule independent TBs on the two carriers. To achieve data duplication, DCI 1 and DCI 2 schedule the same TB on the two carriers. One or more fields in one or both DCI 1 and DCI 2 are used to indicate whether data duplication is used or not. Various examples are described below.

Note that DCI 1 can be received in the primary component carrier or a secondary component carrier. If DCI 1 is received in PCC and its scheduled PDSCH and PUCCH is in SCC as shown in FIG. 5, DCI 1 would then be called a cross-carrier scheduling DCI. If DCI 1 is received in SCC and its scheduled PDSCH and PUCCH is in SCC, then it would be called a self-scheduling DCI.

To configure data duplication across carriers, a UE needs to identify when a TB is duplicated across carriers. One or more of the two DCIs, i.e., self-scheduling DCI of PC, i.e., DCI 2, and self/cross-scheduling DCI of SC (e.g., DCI 1 is a cross-scheduling DCI), include an indication that informs the UE of whether data duplication is taking place or not. The indication may comprise one or more fields in one or both of the DCIs. Indication notifies whether signaled HARQ processes carry same or different data in the carriers for which scheduling DCIs are received.

In a specific example, DCI 1 includes a flag (or other indication) that indicates whether data duplication is taking place or not. With this approach, the same DCI format can be used for both independent scheduling or data duplication. For example:

Flag: 0→legacy CA with independent scheduling,

Flag: 1→data duplication. It should be understood that the flag definitions could be reversed. In addition, it should be understood that the flag may instead be included in DCI 2 for PCC. In addition, below, another example is provided in which there is an additional field in the DCI for both PCC and SCC.

Figure 6:
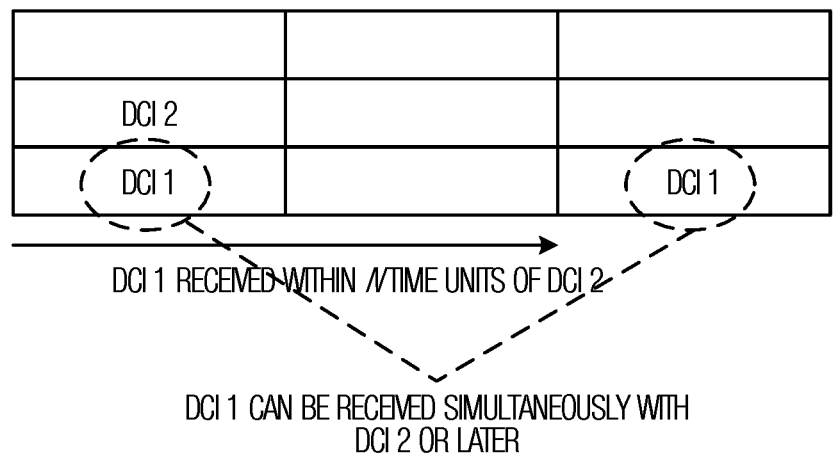
FIG. 6 depicts a block diagram of another example of DCI-based cross-carrier scheduling for two component carriers.
Figure 7:
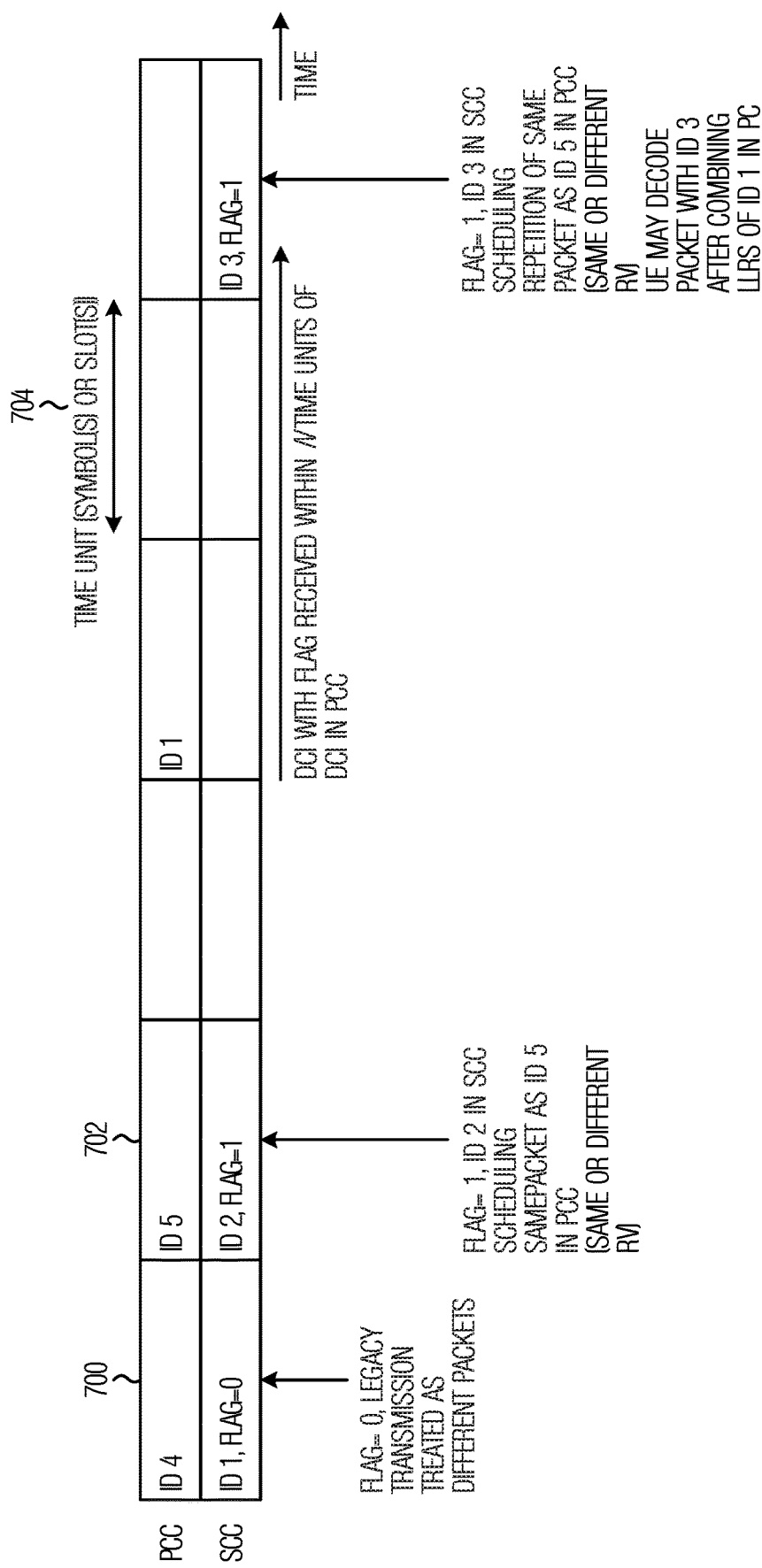
FIG. 7 depicts a block diagram of yet another example of DCI-based cross-carrier scheduling for two component carriers.

In some embodiments, a single-bit flag can indicate the data duplication between the two DCIs (transmitted simultaneously or with a time gap) only in the absence of any other concurrent DCIs for the same RNTI/UE as depicted in FIG. 6 and FIG. 7, described below. In the more general case, a single-bit flag might not be sufficient. Example methods of addressing this are provided below.

FIG. 5 shows an example set of DCI fields for DCI 1 indicated at 510. The fields include a carrier indicator, HARQ Process ID, and the above-discussed flag. More generally, the DCI may include different and/or additional fields (usually including scheduling information such as resource allocation), and the indicator field may be a flag or a field having a different structure.

With this embodiment, the UE may follow HARQ timing indicated in DCI 2 or DCI 1. Independent or same bundling or repetition numbers can be configured/indicated for the TB transmissions in different carriers.

Some prior association may or may not be configured in advance, or semi-statically. A specific relationship between HARQ Process IDs for the two carriers for data duplication purposes may be configured. For example, there may be a configuration that maps HARQ Process ID in DCI 1 to HARQ Process ID in DCI 2 or vice versa for data duplication purposes when the flag=1 (or more generally, when data duplication is indicated).

In some embodiments, specific UEs can be configured by RRC signaling to support the feature.

In a specific example, if HARQ ID i and HARD ID j are received on separate component carriers with the flag set to duplication mode, $\{i, j\} \in \{1, \ldots, N\}$:

The UE may use a configured resource on the PCC (for example on a physical uplink control channel (PUCCH)) to indicate ACK/NACK feedback;

Alternatively, the UE may duplicate ACK/NACK feedback in the HARQ feedback resource corresponding to the DCIs in PCC and SCC;

Alternatively, the UE will not combine the transmissions, and the UE will send ACK/NACK in the corresponding HARQ feedback resources corresponding to the DCIs in PCC and SCC.

In some embodiments, DCI 1 and DCI 2 can be received in the same scheduling period, for example the same transmit time interval (TTI). In another embodiment, DCI 2 may precede DCI 1 by n time units, where n may be a configurable value that can be set, for example by an RRC or DCI or MAC control element (CE). The time units can be symbols or slots.

DCI 1 and DCI 2 can be of the same or different size.

In some embodiments, DCI 1 is a compact DCI that contains at least one of a field indicating a component carrier, HARQ process ID and a field indicating data duplication. In this case, the rest of the fields, such as resource allocation, are either pre-configured or the same as/inherited from DCI 2.

In some embodiments, DCI 2 includes a bandwidth part (BWP) index. A BWP may or may not be indicated in DCI 1.

If a UE is configured for data duplication over a carrier group, the UE can monitor for a subsequent DCI scheduling the same TB within the activity period (n time units referred to above).

FIG. 6 shows an example of DCI-based cross-carrier scheduling. DCI 2 is transmitted to schedule on the PC. DCI 1 is transmitted to schedule a duplicate transmission on the SC. DCI 1 can be transmitted, and received, simultaneously with DCI 2, or later.

Examples of DCI-Based Cross-Carrier Scheduling

Three examples are shown in FIG. 7. In the first example 700, a DCI is transmitted on the PCC with HARQ ID 4, and a DCI is transmitted on the SCC with HARQ ID 1, and flag=0, meaning no duplication. The scheduled TBs are treated as two different TBs, consistent with legacy transmission.

In the second example 702, a DCI is transmitted on the PCC with HARQ ID 5, and a DCI is transmitted on the SCC with HARQ ID 2, and flag=1, meaning duplication. These scheduled TBs are treated as two copies (or redundancy versions) of the same TB.

In the third example 704, a DCI is transmitted on the PCC with HARQ ID 1, and a DCI is transmitted on the SCC with HARQ ID 3 within n time units of the DCI on the PC, and flag=1, meaning duplication. The scheduled TBs are treated as two copies (or redundancy versions) of the same TB.

Figure 8:
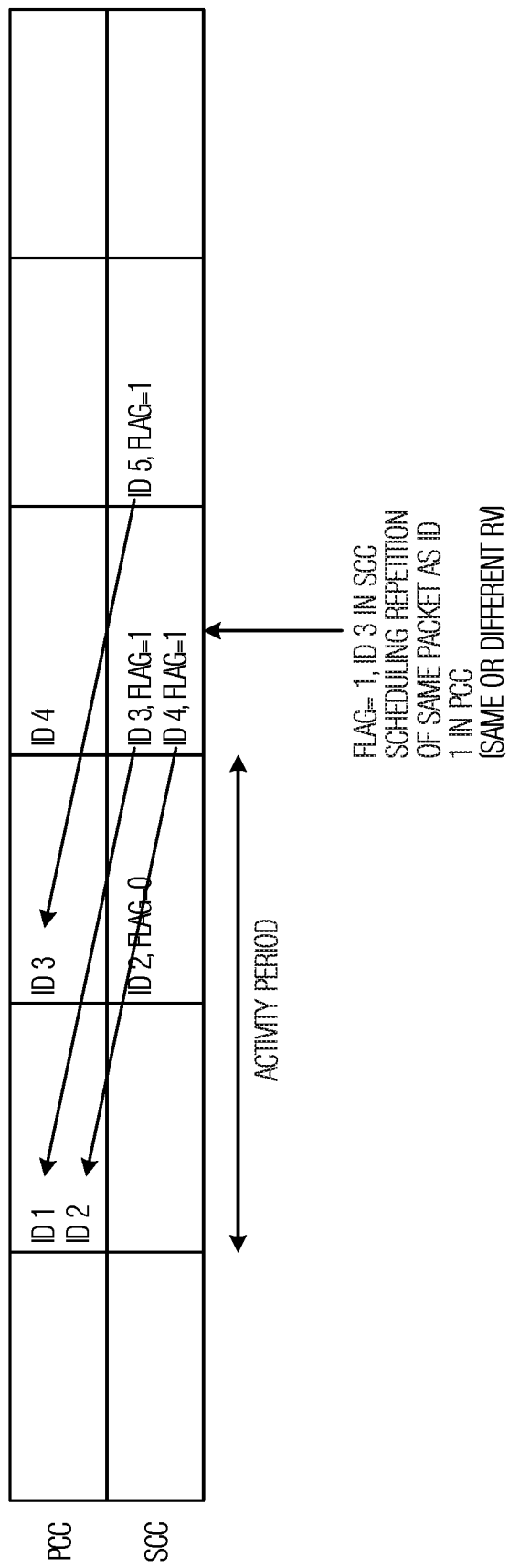
FIG. 8 depicts a block diagram of a further example of DCI-based cross-carrier scheduling for two component carriers.

There can be an ambiguity as to which TB is being duplicated if multiple TBs are scheduled within the window when the indicator is set to indicate duplication. An example is shown in FIG. 8. In this example, initial transmissions on PCC are made with HARQ IDs 1 and 2. Within the activity period, transmissions on the SCC with HARQ IDs 3 and 4, flag=1, are repetitions in respect of the initial transmissions. It is not clear which repetition corresponds to which initial transmission.

In some embodiments, to address the possible ambiguity, the PCC DCI also includes an indicator such as a flag that indicates duplication. Then, two DCIs indicating duplication indicate they are scheduling the same TB if they are transmitted within the activity period. If more than one TB needs data duplication within an activity period, a single bit flag may not be sufficient to avoid ambiguity. In some embodiments, additional bits in the indicator can be used to convey which packets are duplications of which packets.

In some embodiments, a predetermined mapping is used. For example, Odd ID in SCC DCI can be configured to be mapped to Odd ID in PCC DCI, or vice versa. For example:

IDs in SCC: 2m−1 (with flag=1), 2m (with flag=0), 2m+1 (with flag=1), 2m+2 (with flag=1) . . .

IDs in PC: 2n−1, 2n, 2n+1, 2n+2

Here, m and n are positive integers.

In some embodiments, a mapping rule can be established as:

2m−1→2n−1, 2m+1→2n+1, 2m+2→2n

In the example above, 2m+2 maps to 2n because 2m was skipped and not used for duplication. Hence, the UE may assume active odd processes with flag 1 in SCC map to the active odd processes in order in the PCC.

In some embodiments, a fallback behavior is configured whereby if a UE misses one DCI (e.g., PCC DCI), the UE will send ACK/NACK independently for the SCC transmission. Combination of the multiple transmissions by the UE is not possible in this case.

Alternatively, there can be a pre-configured association between HARQ processes of the HARQ entities of the PCC and SCC. For example:

HARQ i, i={1, 2, . . . , K} in PCC, HARQ j, j={1, 2, . . . , M}, in SCC, K, M=>1

HARQ $j_1 \rightarrow \{i_1, i_2, \ldots, i_{Km}\}$, $j_1 \in \{1, 2, \ldots, M\}$, $i_p, i_q \in \{1, 2, \ldots, K\}$, $i_p \neq i_q$, Km<K.

If process $j_1$ is scheduled in SCC with flag=1, the UE knows that process $j_1$ corresponds to one of processes $\{i_1, i_2, \ldots, i_{Km}\}$ which is scheduled in PCC when or before the DCI for $j_1$ is received. The mapping procedure can be semi-statically indicated to the UE or obtained by the UE from a configured look-up table.

Mapping might not be unique for HARQ processes, for efficiency. In this case it is up to the network implementation to make sure scheduled HARQ processes do not conflict when data duplication is indicated.

In this example, a flag or other indication in one or more of the scheduling DCIs is included. A DCI format can be used for this purpose. HARQ process mapping configuration across carriers and/or which carriers are used for duplication can be semi-statically indicated to the UE.

In another example, there may not be any prior association or mapping configuration of HARQ process and/or carrier group. One or more of scheduling DCIs in PCC and SCC(s) may include one or more of: carrier indices of the other carrier(s) where DCI for duplication or same packet transmission is received, HARQ indices which are used in the DCIs sent over other carriers participating in duplication. This indication may be in addition to the carrier index and HARQ process ID indication in the DCI for a given carrier.

Method 2B: Use One DCI to Schedule Over Multiple Component Carriers

In these embodiments, one DCI received in a component carrier schedules duplicate TBs over multiple carriers. In one example, one HARQ Process ID and one HARQ timing is indicated. Alternatively, separate HARQ Process ID and same or different HARQ timing is indicated for indicated carriers. This DCI format can be received in the PC. The BWP in the SCC may be associated with for the PCC. In this case, the UE gets duplicate versions of a TB over multiple carriers. Optionally, a Carrier Indicator for SCC can be included in the DCI. Optionally, a BWP indicator for SCC or PCC or both is included in the DCI. Other regular fields can be included as usual, including fields such as MCS, Resource allocation, multi-antenna indication. Those regular fields can be common for transmission over multiple carriers, or can be different and explicitly indicated for different carriers. There can be one set of parameters for both BWPs or separate sets of parameters for each BWP. The same or different numerologies can be employed for the two transmissions.

For example, in some embodiments, separate resource allocation fields are included for the two component carriers. Resource allocation could be different for the two component carriers depending on the available RB indices per carrier. Also, in some embodiments, separate MCS fields are included for the two component carriers. The MCS may differ for the two component carriers due to the different channel quality across the carriers.

Figure 9A:
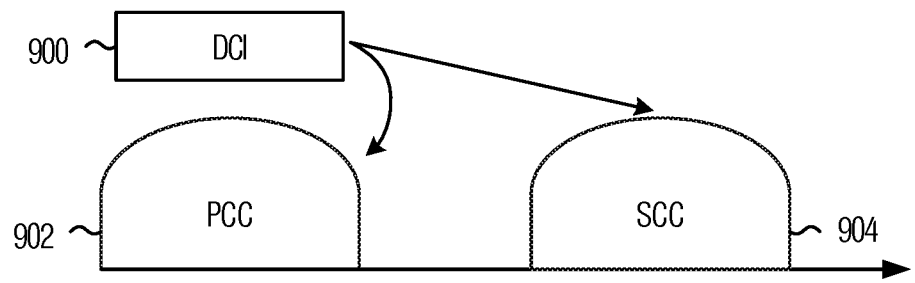
FIG. 9A depicts a block diagram of an example of using one DCI to schedule over multiple component carriers.
Figure 9B:
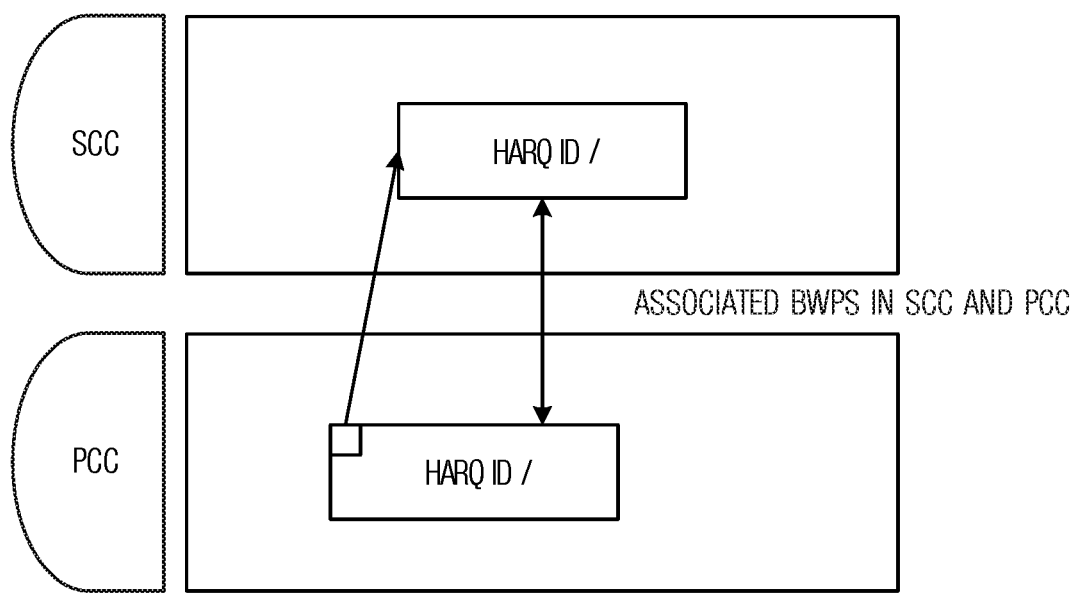
FIG. 9B depicts a block diagram of another example of using one DCI to schedule over multiple component carriers.

An example is shown in FIG. 9A which shows a single DCI 900 that schedules duplicate TBs over a PCC 902 and an SCC 904. FIG. 9B shows an example where there are associated BWPs in the SCC and the PC.

The DCI format examples discussed above can be received in UE specific search space or common search space.

UE Side Operation

For any of the embodiments described herein, a UE may combine duplications of a TB received over different carriers. For repetition, log likelihood ratios (LLRs) of transmissions received over different carriers can be added before feeding to the decoder. In this case, HARQ feedback may be generated once. Combining duplications may involve the HARQ entities of the group of carriers sharing soft buffers of the HARQ entities. In another embodiment, selection combining is performed. Alternatively, the UE does not combine duplications of a TB received over different carriers, and sends ACK/NACK for each transmission.

Figure 10:
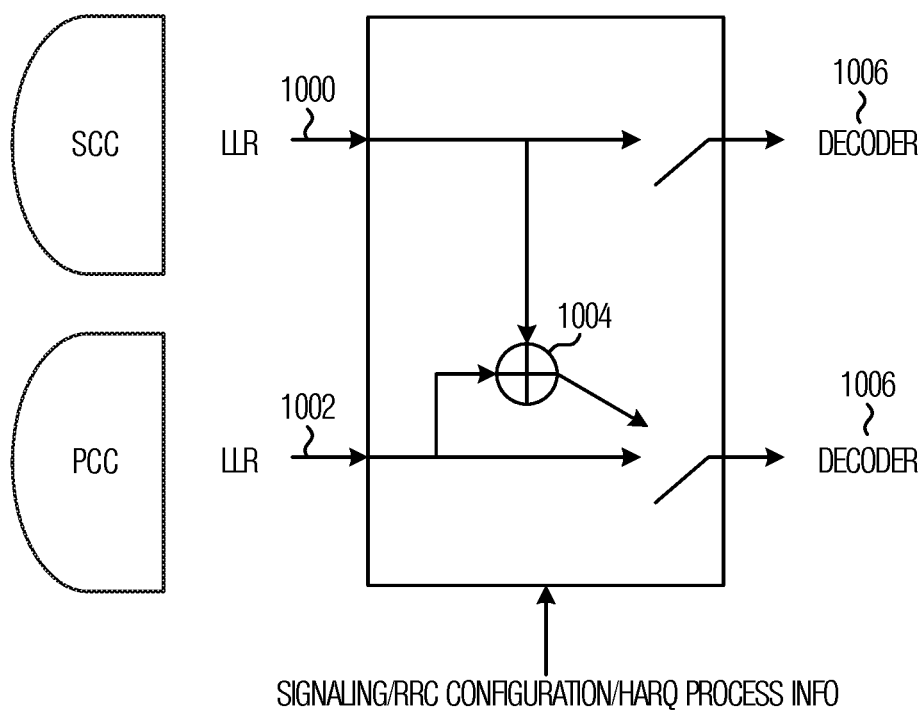
FIG. 10 depicts a block diagram of an example of combining repetitions/retransmission of a TB over different carriers.

An example UE side implementation is depicted in FIG. 10. Shown are two LLRs produced for TBs received on the SCC 1000 and PCC 1002 respectively. These can be combined at 1004 before being passed to the decoder 1006. Alternatively, the LLRs are passed separately to the decoder 1006 where they are decoded separately.

HARQ Codebook

HARQ feedback generated for carrier aggregation with the same HARQ process shared across multiple carriers may require a modified HARQ codebook generation. A UE may generate a common HARQ feedback after combining the duplications across the carriers. In some embodiments, a HARQ codebook is defined which specifies HARQ feedback for one or more of the embodiments described herein. The size of HARQ codebook can be decided by:

Downlink assignment index (DAI) (e.g. 2 bit), informing the UE about the number of downlink transmissions for which a single hybrid-ARQ acknowledgment should be generated. The codebook collects a combination of ACK/NACK feedbacks, where the number of ACK/NACKs combined can be dynamically indicated in the DCI in the form of DAI;

HARQ codebook contains ACK/NACK of one or more transmissions, some can be codeblock group (CBG)-based, some can be transport block (TB)-based.

Figure 11:
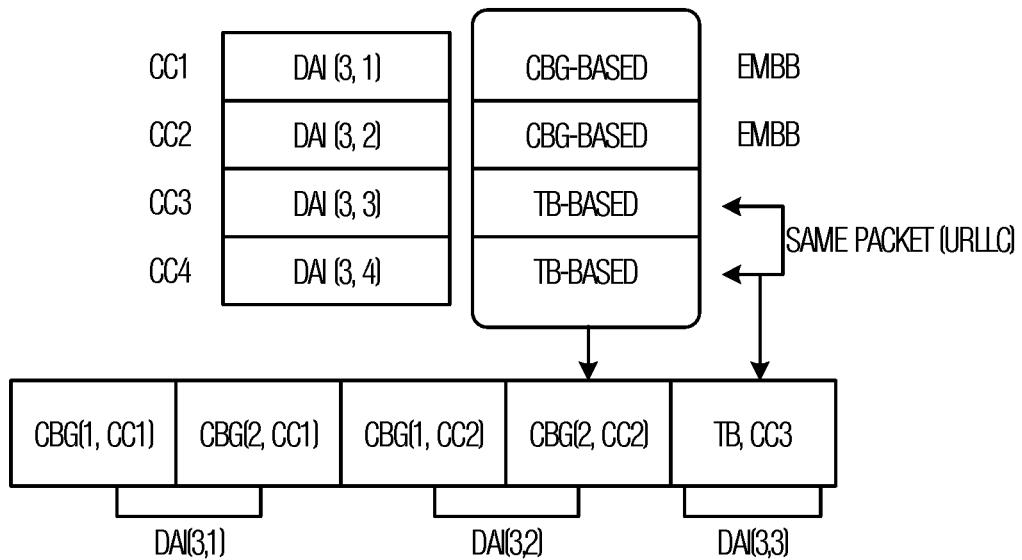
FIG. 11 depicts a block diagram of HARQ codebook configuration.

FIG. 11 shows an example, where a UE may have different types of traffic transmission ongoing, such as enhanced mobile broadband (eMBB) and ultra reliable low latency communications (URLLC). eMBB transmission can be code block group (CBG)-based and URLLC transmission can be TB-based. In this example, each eMBB transmission is configured with up to two CBGs for feedback. DAI (N, i) indicates ith feedback in the codebook where there are N total feedbacks combined in the message. For example, DAI (3,1) and DAI (3,2), each have two sub-fields within the ACK/NACK message for corresponding downlink transmission, each sub-field accounting for a CBG. DAI (3,3) is common for CC3 and CC4 because the UE is configured to have a common HARQ feedback for the same TB transmission over CC3 and CC4. Mapping of the DAIs to the fields may be arranged in the order of the CC index.

Figure 12:
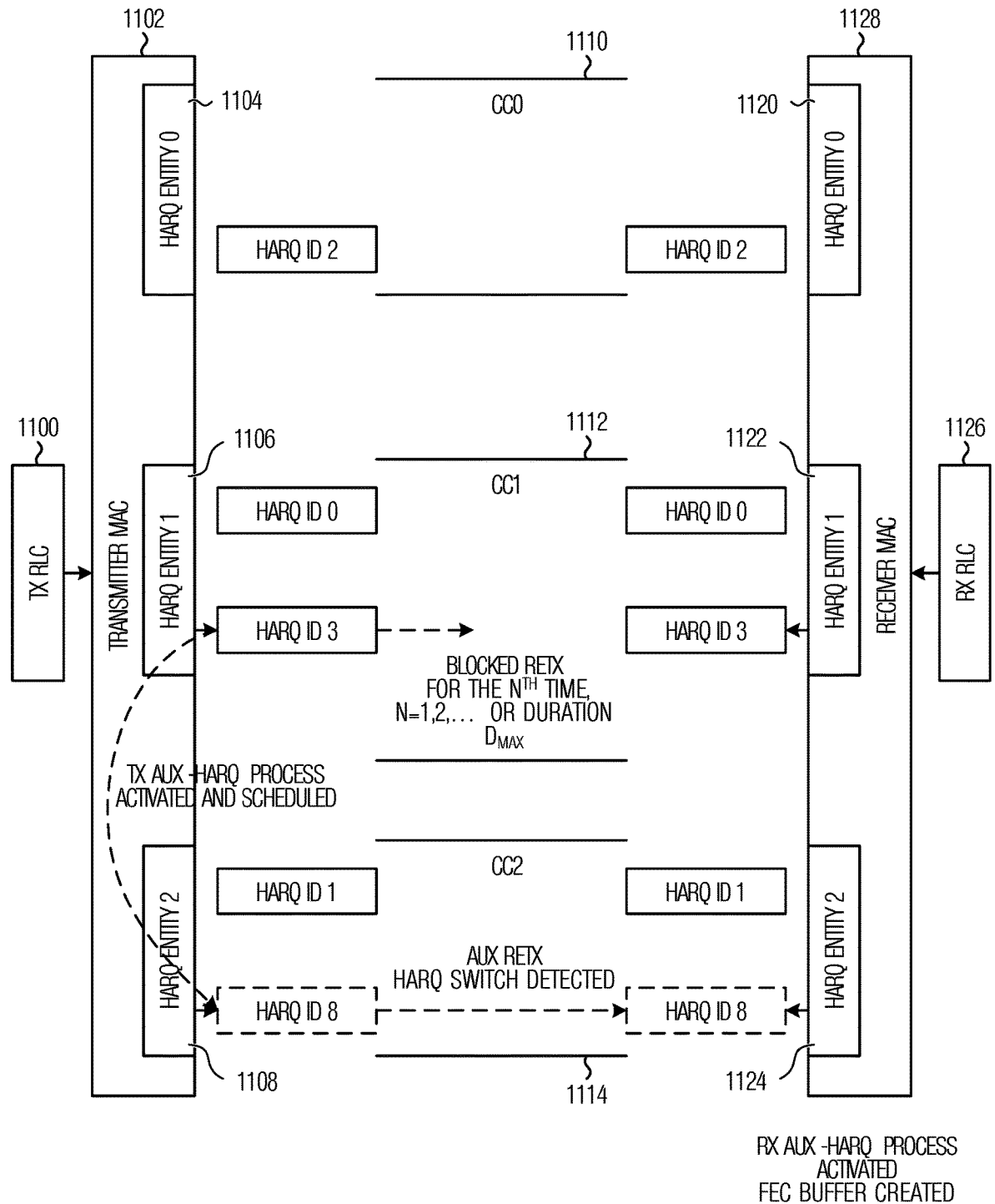
FIG. 12 depicts a block diagram of a system for transmission over unlicensed spectrum.

Referring now to FIG. 12, shown is a block diagram of a system for transmission over unlicensed spectrum, using auxiliary HARQ Processes for multi-carrier operations, in accordance with an embodiment of the invention. Auxiliary HARQ processes may also be referred to as switched HARQ processes. Auxiliary and switched HARQ processes may be used interchangeably.

On the transmit side, there is a transmit RLC 1100, transmit MAC 1102 (including MAC scheduler) that implements a respective HARQ entity 1104,1106,1108 for each of three component carriers 1110,1112,1114. At the receiver side, there is a receive MAC 1128 that implements a respective HARQ entity 1120,1122,1124 for each of the three component carriers 1110,1112,1114, and a receive RLC 1126.

In operation, initial transmissions are made using one component carriers, and using the associated HARQ entity, with a HARQ process ID. If no positive acknowledgement (ACK) has been received from the receiver within an expected window of time after the transmission, a retransmission is initiated using the same component carrier and HARQ process ID.

Because LBT is used before transmissions, a retransmission may or may not be transmitted depending on the availability of the channel. A transmission that is not transmitted is said to be blocked. The transmitter MAC 1102 monitors (for example using a timer) the blocking time during which a retransmission of a HARQ process (HARQ ID i) that was initiated on a component carrier (CCx) is being blocked. As an alternative to using a timer, a count of the number of retransmission attempts can be made, with a certain number of retransmission attempts functioning as a trigger for activating an auxiliary HARQ process, as detailed below.

In a specific example, a timer at the transmitter MAC 1102 is started at the instant at which the HARQ feedback of process i is due on CCx. In this case, the timer also accounts for the pre-defined window of time within which the HARQ feedback is expected. In another embodiment, the timer can be started once the corresponding negative acknowledgement (NACK) has been received or the corresponding HARQ feedback is overdue. In the case of the HARQ feedback being overdue, the timer accounts as well for the blocking delay of the feedback at the receiving end.

The timer at the transmitter MAC 1102 is specific to the UE's HARQ process i on CCx if the transmitter resets once the retransmission attempt is successful or after the timer expires (or reaches a higher-layer configured maximum). Alternatively, the timer can be specific to the HARQ entity such that the timer's value can be accumulated from the associated set of HARQ processes until the timer expires (or reaches a greater higher-layer configured maximum), and then a set of auxiliary HARQ processes are activated concurrently as a group event.

Upon expiry of the timer, the transmitter MAC activates an auxiliary HARQ process on a different component carrier CCy and schedules and then transmits a retransmission using the auxiliary HARQ process. In some embodiments, for a given CCx, another component carrier CCy for auxiliary retransmission is chosen in advance. In other embodiments, CCy is dynamically selected from a carrier or cell group that the receiver has been configured to use.

The receiver MAC 1128 can also monitor the excess retransmission delay time beyond a HARQ round trip time (RTT) timer value that has been pre-configured through higher-layer signaling such as RRC.

The RTT timer at the receiver MAC 1128 can be initialized at the instant at which the HARQ RTT timer elapses from the last (re)transmission of HARQ process i on CCx. The timer can be reset upon receiving the retransmission of HARQ process i.

Similar to the transmitter side timer, the timer at the receiver MAC is either specific to the UE's HARQ process i on CCx or the HARQ entity on CCx.

Once the timer value in the receiver exceeds a pre-configured parameter (e.g. HARQReTxMaxDelay), the receiver MAC 1128 can trigger the receive HARQ to change to the auxiliary HARQ process and indicate the change to the transmitter, for example through control signaling over a more reliable (e.g., licensed) CC.

Referring again to FIG. 12, in a specific example, a TB transmission is taking place using HARQ ID 3 on CC1 1112. A retransmission is attempted, using the same HARQ ID and component carrier. After the retransmission is blocked for the duration of a timer (Dmax), the Transmit MAC 1102 activates a transmit auxiliary HARQ process on a different component carrier. In the example illustrated, the auxiliary HARQ process is initiated with HARQ ID 8 on CC2 1114. The auxiliary HARQ process is scheduled and activated on CC2. Correspondingly, in the receiver activates a receive auxiliary HARQ process to receive the retransmission on CC2.

In a specific example, retransmissions of the TB associated with the active HARQ process (HARQ ID i) on CCx can be changed by the transmitter to the first idle HARQ process j on a component carrier. Note that different component carriers may be associated with the same or different cells/transmission/receiving point (TRP).

In some embodiments, to reduce the overhead associated with indicating the HARQ process ID to be activated on CCy, a subset of such 'auxiliary' HARQ process IDs can be defined using a semi-statically configured mapping table or rule. If the first auxiliary HARQ process ID in the subset is busy, then the second auxiliary HARQ process ID in the subset is selected, and can be indicated to the receiver using fewer bits than would be required to select from an entire set of HARQ process IDs. Alternatively, the auxiliary HARQ process ID is pre-configured for a given HARQ process on CCx. For grant-free transmissions, such as grant-free uplink transmissions, this can be a one-to-many mapping, with the transmitter responsible for selecting an available one of the mapped HARQ processes. For scheduled uplink and downlink transmissions, this can be a one-to-many mapping, with the scheduler responsible for selecting an available one of the mapped HARQ processes. Alternatively, the auxiliary HARQ process ID (optionally along with the carrier index of CCy) may be signaled in a DCI.

In some embodiments, there is a default mode of operation that is used if no auxiliary HARQ process is available, in which retransmissions/repetitions are performed using the same component carrier as an original transmission.

Once the receiver detects the change in the component carrier used for retransmissions, the corresponding idle auxiliary HARQ process is activated on CCy along with its receive FEC buffer.

Figure 13:
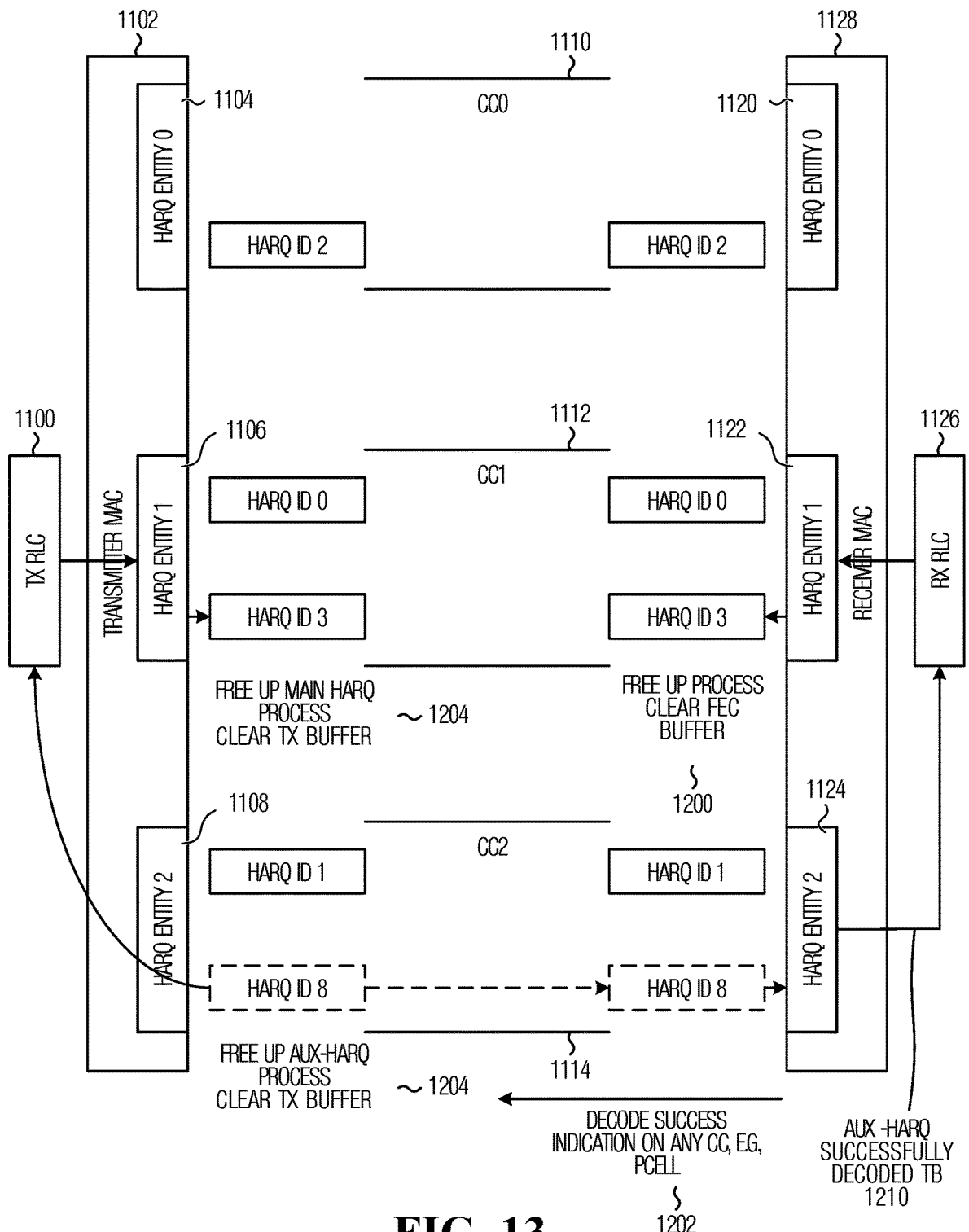
FIG. 13 depicts a block diagram of a system for transmission over unlicensed spectrum showing additional steps that may be implemented following successful TB decoding in the receiver.

Referring to FIG. 13, shown is another view of the system of FIG. 11, showing additional steps that may be implemented following successful TB decoding in the receiver. The receive side RLC 1126 collects a successfully decoded TB at 1210 (from either process i or its activated auxiliary process(es)) and updates its receive window.

An indication 1200 to free up the main and associated auxiliary process(es) and clear their FEC buffers is provided to respective HARQ entities directly or through the MAC or through the receiver RLC sub-layer. A decode success indication (e.g. ACK) 1202 is transmitted back to the receiver. In some embodiments this can be sent on any of the component carriers involved.

Upon receiving a decode success indication, the transmit side RLC 1100 updates its PDU transmit window, and generates an indication 1204 to free up all associated processes and clear their circular transmit buffers, which is provided to respective HARQ entities. Alternatively, the HARQ entity for which a success indication has been received can signal the remaining HARQ entities through the transmit MAC to clear their respective transmit buffers.

In some embodiments, one or more of the methods described herein applied to New Radio-unlicensed (NR-U) uplink grant based retransmissions in respect of initial uplink grant based transmissions, where the uplink grant of retransmission and granted uplink resource can be in different component carrier from the initial transmission.

In some embodiments, the UE is configured to inform the network (for example by informing a gNB) of its capability to soft-combine TBs received across multiple CCs. Based on this information, the network can then decide on the redundancy version to use with auxiliary HARQ retransmission. For example, for transmission to a UE that is not capable of such soft-combining, the retransmission can be a complete retransmission of the original TB. For example, for transmission to a UE that is not capable of such soft-combining, the retransmission can be a complete independent retransmission of the original TB.

In some embodiments, the network transmits a configuration of auxiliary HARQ Processes/Mapping Rule. For example, a gNB may semi-statically configure the UEs with the auxiliary HARQ processes through higher layer signaling, e.g., RRC. The mapping rule can be signaled as a lookup table or parameters of a pre-determined formulae/arithmetic procedure.

In some embodiments, the mapping rule is a lookup table. An example is shown in FIG. 14A which maps a main HARQ ID i to the pre-configured auxiliary HARQ Process IDs j. The example shown in FIG. 14A also shows the mapping of main HARQ ID i to the pre-configured auxiliary HARQ Process IDs k and l. As used herein, a main HARQ ID and an original HARQ ID are interchangeable.

Figure 14B:
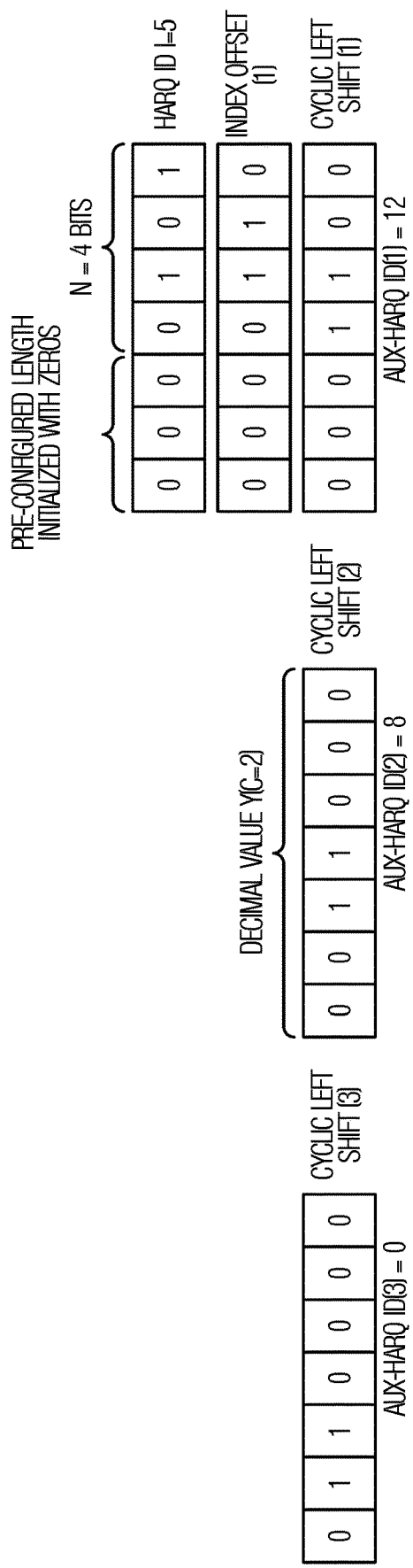
FIG. 14B depicts a block diagram of an example of an index offset used to indicate the auxiliary HARQ Process ID.

In some embodiments, wherein a pre-determined formula/arithmetic procedure is employed, an index offset and/or a cyclic shift is used to calculate the auxiliary HARQ Process ID. The cyclic shift register can hold the HARQ ID i in n binary bits concatenated with a predefined number of bits that are started with zeros or the carrier indication field (CIF) bits of CCx. The index offset is applied to the cyclic shift register to avoid corner cases such as all zeros or all ones HARQ ID i. An all zeros or all ones HARQ ID i is a situation where a value representing HARD ID i is represented in the shift register as all binary zeros or all binary ones. An example is shown in FIG. 14B. In some embodiments, a one-to-many mapping rule involves applying a number of binary ID shifts, each binary ID shift having an associated index that can be used to communicate a specific binary ID shift in dynamic signalling. In some embodiments, both the index offset, and the number of binary ID shifts are used in combination.

Figure 14C:
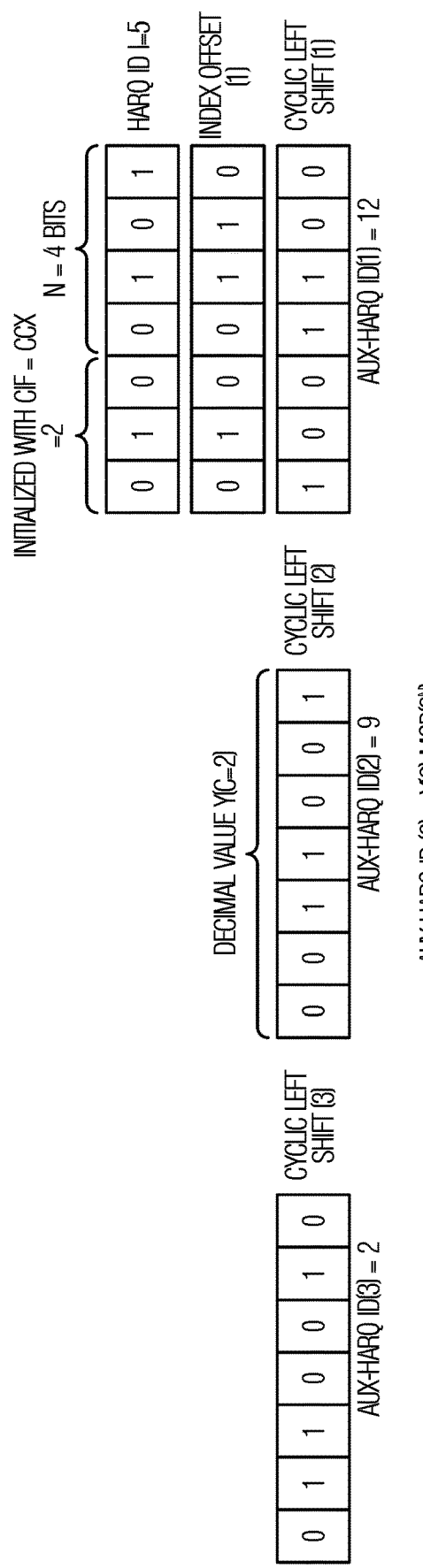
FIG. 14C depicts a block diagram of an example of binary ID shifts used to indicate the auxiliary HARQ Process ID.

In some embodiments one or more parameters are signaled, which are applied to a formula. An example is shown in FIG. 14C. In FIG. 14C, the resource identifier CIF of CCx is used in concatenation with the n bits of the HARQ ID of the HARQ Process i. Other techniques may be used to combine the resource identifier CIF and the HARQ ID, such as addition, subtraction, multiplication, and so on.

Dynamic Indication of Switching to Auxiliary HARQ

If the network needs to retransmit HARQ process i on CCx but its LBT before the retransmission fails on CCx or a BWP thereof, after receiving a NACK or not receiving any feedback for a preset duration, a DCI for the retransmission takes place on CCy or a BWP thereof instead of CCx using one of the following methods depending on whether a mapping rule or formula is pre-configured and whether the DCI is cross-carrier scheduling or self-scheduling.

Explicit Indication in DCI (No Mapping Rule is Pre-Configured)

a. Cross-carrier scheduling DCI (e.g., from a licensed PCC):

The DCI comprises indications of one or more of:
identifier of the original component carrier CCx;
original HARQ process ID i on CCx;
identifier of the new component carrier CCy on which the the auxiliary HARQ process is activated;
auxiliary HARQ process ID;
the same TB as switched original;
a new resource allocation corresponding to CCy (optionally, resource allocation is in units of resource blocks (RBs), and a resource block allocation for CCy include a number of resource blocks that is the same as a number of RBs allocated on CCx);
either same or a different modulation and coding scheme (MCS) based on the new RB allocation;
redundancy version (optionally based on UE capability of soft-combining across component carriers);
Same new data indicator (NDI) as original (non-toggled).

b. Self-carrier scheduling DCI (transmitted on intended CC):

The DCI comprises indications of one or more of:
Index of original carrier CCx. However, this is not needed if a pool of HARQ processes is shared across the CCs);
original HARQ process i on CCx;
auxiliary HARQ process ID;
the same TB as switched original;
a new resource block allocation corresponding to CCy (optionally, same number of RBs can be maintained);
either same or a different modulation and coding scheme (MCS) based on the new RB Allocation;
redundancy version (optionally based on UE capability of soft-combining across component carriers);
Same new data indicator (NDI) as original (non-toggled).

Implicit Indication in DCI (mapping rule is pre-configured)

a. Cross-carrier scheduling DCI (e.g., from licensed PCC):

Format A1: The DCI comprises indications of one or more of:
original HARQ process i on CCx;
identifier of the new component carrier CCy on which the auxiliary HARQ process is activated;
Shift Index (Number of cyclic shifts for the mapping rule or number of table entries to skip in a mapping table);
Format Bit (for UE to distinguish between formats A1 and A2 if they are identical in size);
the same TB as switched original;
a new resource block allocation corresponding to CCy (optionally, same number of RBs can be maintained);
either same or a different modulation and coding scheme (MCS) based on the new RB Allocation;
redundancy version (optionally based on UE capability of soft-combining across component carriers);
same new data indicator (NDI) as original (non-toggled).
Using the indicated CCy and switched HARQ ID i, the UE can to obtain the pair (CCx, Aux-HARQ ID j). As a validation of the received DCI, UE can check if obtained CCx had the HARQ ID i among its associated processes. This is in addition to the same TB size as original and the non-toggled NDI field w.r.t that of the original DCI scheduled process i.

Format A2: The DCI comprises indications of one or more of:
Auxiliary HARQ process ID j;
Identifier of original component carrier CCx;
Shift Index (Number of cyclic shifts for the mapping rule or number of table entries to skip in a mapping table);
Format Bit (for UE to distinguish between formats A1 and A2 if they are identical in size);
the same TB as switched original;
a new resource block allocation corresponding to CCy (optionally, same number of RBs can be maintained);
either same or a different modulation and coding scheme (MCS) based on the new RB Allocation;
redundancy version (optionally based on UE capability of soft-combining across component carriers);
same new data indicator (NDI) as original (non-toggled).
Using the indicated CCx, which is not the CC ID being scheduled unlike legacy cross-carrier scheduling DCI formats, and the auxiliary HARQ ID j, the UE can to obtain the pair (CCy, HARQ ID i). As a validation of the received DCI, UE can check if obtained HARQ ID i is among the associated processes of CCx. This is in addition to the same TB size as original and the non-toggled NDI field w.r.t that of the original DCI scheduled process i.

b. Self-carrier scheduling DCI:

Format B1: The DCI comprises indications of one or more of:
original HARQ process i on CCx;
Shift Index (Number of cyclic shifts for the mapping rule or number of table entries to skip in a mapping table corresponding to scheduled CCy);
Format Bit (for UE to distinguish between formats B1 and B2 if they are identical in size);
the same TB as switched original;
a new resource block allocation corresponding to CCy (optionally, same number of RBs can be maintained);
either same or a different modulation and coding scheme (MCS) based on the new RB Allocation;
redundancy version (optionally based on UE capability of soft-combining across component carriers);
Same new data indicator (NDI) as original (non-toggled).
Using the self-carrier index of CCy and switched HARQ ID i, the UE can to obtain the pair (CCx, Aux-HARQ ID j). In some embodiments, Format B1 can imply that j=i for simplicity As a validation of the received DCI, UE can check if obtained CCx had the HARQ ID i among its associated processes. This is in addition to the same TB size as original and the non-toggled NDI filed w.r.t that of the original DCI scheduled process i.

Format B2: The DCI comprises indications of one or more of:
Auxiliary HARQ process ID j;
Shift Index (Number of cyclic shifts for the mapping rule or number of table entries to skip in a mapping table corresponding to scheduled CCy);
Format Bit (for UE to distinguish between formats A1 and A2 if they are identical in size);
the same TB as switched original;
a new resource block allocation corresponding to CCy (optionally, same number of RBs can be maintained);
either same or a different modulation and coding scheme (MCS) based on the new RB Allocation;

redundancy version (optionally based on UE capability of soft-combining across component carriers);

same new data indicator (NDI) as original (non-toggled).

Using the scheduled CCy and the auxiliary HARQ ID j, the UE can to obtain the pair (CCx, HARQ ID i). In some embodiments, Format B2 can imply that i=j for simplicity. As a validation of the received DCI, UE can check if obtained HARQ ID i is among the associated processes of CCx. This is in addition to the same TB size as original and the non-toggled NDI filed w.r.t that of the original DCI scheduled process i.

In some embodiments, downlink assignments for subsequent retransmissions of the same TB on CCy follow normal procedure indicating the auxiliary HARQ ID.

Figure 15A:
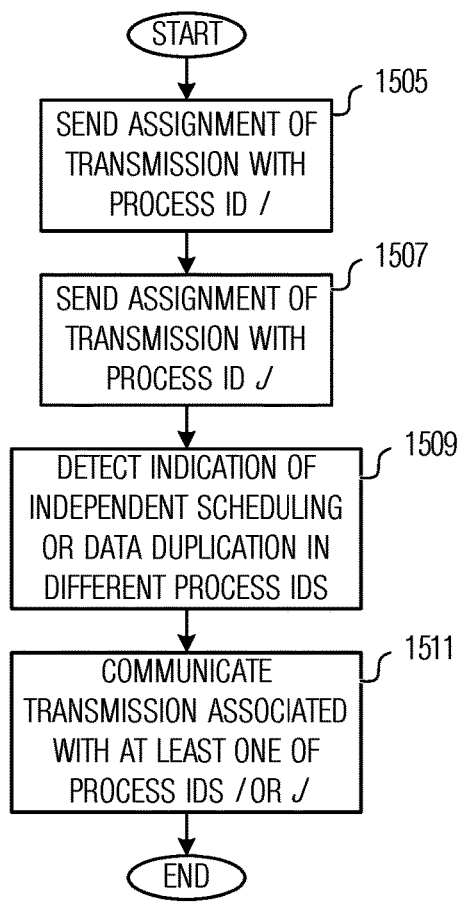
FIG. 15A illustrates a flow diagram of example operations occurring in an access node.

FIG. 15A illustrates a flow diagram of example operations occurring in an access node operating in accordance with the example embodiments presented herein.

Operations begin with the access node sending an assignment of a transmission with HARQ Process ID i (block 1505). The transmission may be of a transmission block in a first network resource. Examples of network resources include time resources, frequency resources, time-frequency resources, code resources, carriers, component carriers, cells, or BWPs. The access node sends an assignment of a transmission with HARQ Process ID j (block 1507). The transmission may be of a transmission block in a second network resource. The access node detects an indication that the HARQ Process ID i and the HARQ Process ID j map to the same transmission block (block 1509). As an example, the access node detects that the indication indicates independent scheduling or data duplication in different HARQ Process IDs. As another example, the access node detects expiration of a RTT timer (either a transmit RTT timer for situations when the access node is transmitting or a receive RTT timer for situations when the access node is receiving) as the indication. The access node communicates the transmission associated with either of the HARQ Process IDs (block 1511). As used in this disclosure, communication applies to transmitting the transmission, receiving the transmission, or both transmitting and receiving the transmission.

Figure 15B:
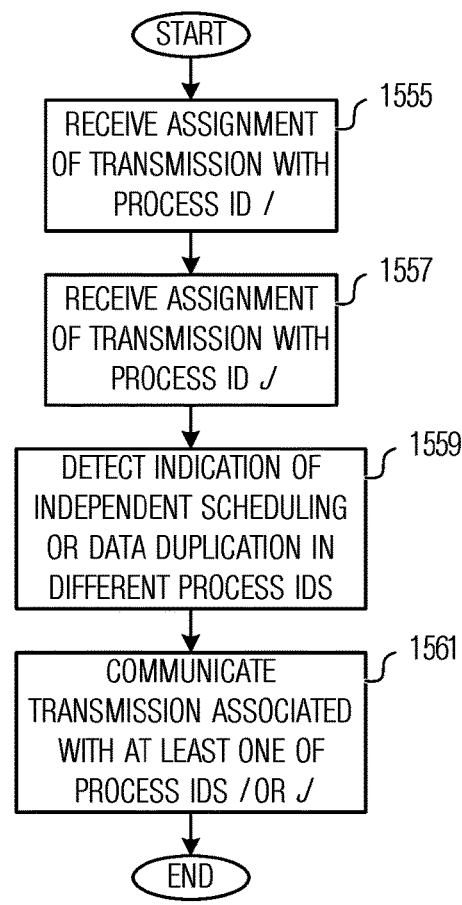
FIG. 15B illustrates a flow diagram of example operations occurring in a UE.

FIG. 15B illustrates a flow diagram of example operations occurring in a UE operating in accordance with the example embodiments presented herein.

Operations begin with the UE receiving an assignment of a transmission with HARQ Process ID i (block 1555) The transmission may be of a transmission block in a first network resource. The UE receives an assignment of a transmission with HARQ Process ID j (block 1557). The transmission may be of a transmission block in a second network resource. The UE detects an indication that the HARQ Process ID i and the HARQ Process ID j map to the same transmission block (block 1559). As an example, the UE detects that the indication indicates independent scheduling or data duplication in different HARQ Process IDs. As another example, the UE detects expiration of a RTT timer (either a transmit RTT timer for situations when the UE is transmitting or a receive RTT timer for situations when the UE is receiving) as the indication. The UE communicates the transmission associated with either of the HARQ Process IDs (block 1561).

Figure 16A:
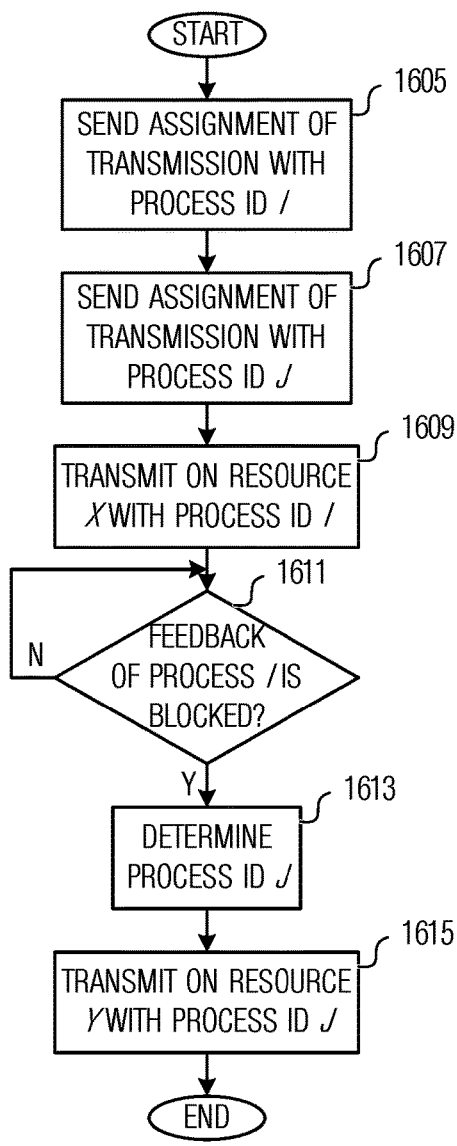
FIG. 16A illustrates a flow diagram of example operations occurring in an access node transmitting when a network resource becomes blocked.

FIG. 16A illustrates a flow diagram of example operations occurring in an access node transmitting when a network resource becomes blocked.

Operations begin with the access node sending an assignment of a transmission with HARQ Process ID i (block 1605). The transmission may be of a transmission block in a first network resource. The access node sends an assignment of a transmission with HARQ Process ID j (block 1607). The transmission may be of a transmission block in a second network resource. The access node transmits the transmission on network resource X that is associated with HARQ Process ID i (block 1609). The access node performs a check to determine if feedback associated with HARQ Process ID i is blocked (block 1611). As an example, the feedback associated with HARQ Process ID i is blocked if the access node does not receive the feedback before expiration of a transmit RTT associated with the HARQ Process ID i. If the feedback is not blocked, the access node returns to continue checking.

If the feedback is blocked, the access node determines the HARQ Process ID j (block 1613). As an example, the access node determines the HARQ Process ID j utilizing a lookup table, such as shown in FIG. 14A. As another example, the access node determines the HARQ Process ID j using a pre-determined formula/arithmetic procedure with or without parameters, such as shown in FIGS. 14B and 14C. The access node transmits on resource Y that is associated with HARQ Process ID j (block 1615).

Figure 16B:
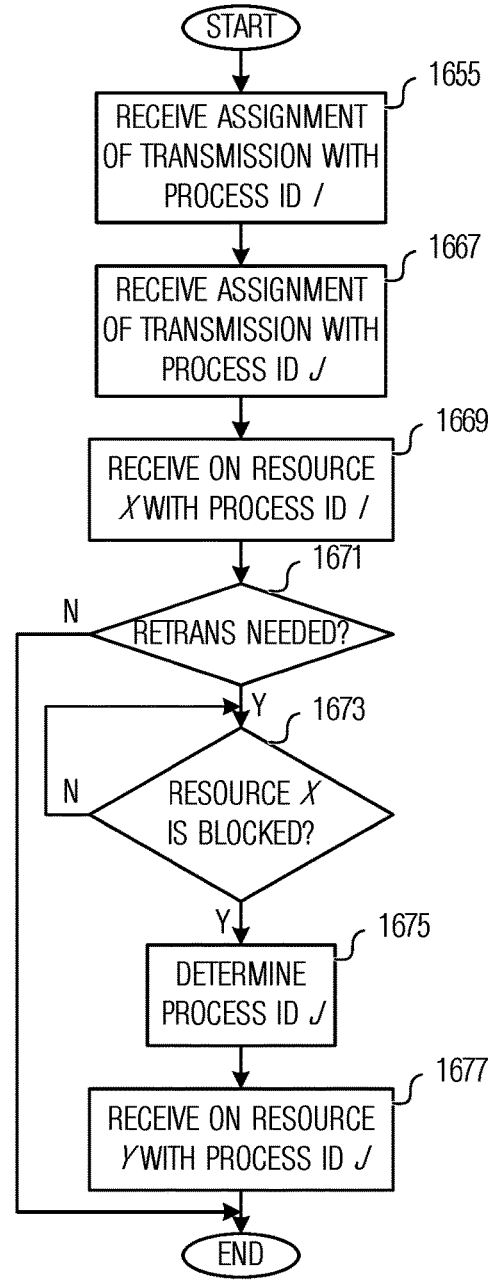
FIG. 16B illustrates a flow diagram of example operations occurring in a UE receiving when a network resource becomes blocked.

FIG. 16B illustrates a flow diagram of example operations occurring in a UE receiving when a network resource becomes blocked.

Operations begin with the UE receiving an assignment of a transmission with HARQ Process ID i (block 1655). The transmission may be of a transmission block in a first network resource. The UE receives an assignment of a transmission with HARQ Process ID j (block 1657). The transmission may be of a transmission block in a second network resource. The UE receives the transmission on resource X that is associated with HARQ Process ID i (block 1669). The UE performs a check to determine if a retransmission is needed (block 1671). As an example, if the UE is unable to successfully decode the transmission, a retransmission is needed. If a retransmission is not needed, operations complete.

If a retransmission is needed, the UE transmits a NACK and performs a check to determine if resource X is blocked (block 1673). As an example, the resource X is blocked if a retransmission of the transmission is not received before expiration of a receive RTT associated with the HARQ Process ID i. If the resource X is not blocked, the UE returns to continue checking. If the resource X is blocked, the UE determines the HARQ Process ID j (block 1675). As an example, the UE determines the HARQ Process ID j utilizing a lookup table, such as shown in FIG. 14A. As another example, the UE determines the HARQ Process ID j using a pre-determined formula/arithmetic procedure with or without parameters, such as shown in FIGS. 14B and 14C. The UE receives on resource Y that is associated with HARQ Process ID j (block 1675).

The following provides a non-limiting list of example embodiments of the present disclosure:

Example Embodiment 1

A computer-implemented method comprising sending, by an access node, a first assignment for a first transmission with a first HARQ process identifier (process ID) in a first network resource, sending, by the access node, a second assignment for a second transmission with a second HARQ process ID in a second network resource, wherein the first network resource and the second network resource differ in a domain other than a time domain, detecting, by the access node, an indication indicating that the first HARQ process ID and the second HARQ process ID map to a same TB, and communicating, by the access node, with a UE, a transmission associated with at least one of the first HARQ process ID or the second HARQ process ID.

Example Embodiment 2

The computer-implemented method of example embodiment 1, wherein communicating the transmission comprises transmitting, by the access node, the transmission to the UE.

Example Embodiment 3

The computer-implemented method of example embodiment 1, wherein communicating the transmission comprises receiving, by the access node, the transmission from the UE.

Example Embodiment 4

The computer-implemented method of example embodiment 1, wherein the indication is a semi-static configuration.

Example Embodiment 5

The computer-implemented method of example embodiment 1, wherein the indication is a combination of a semi-static configuration and dynamic signaling.

Example Embodiment 6

The computer-implemented method of example embodiment 1, wherein the indication comprises an indication indicating that a pool of HARQ process IDs are common across at least the first and second network resources, wherein the first HARQ process ID and the second HARQ process ID are the same to indicate that the first and second HARQ process IDs map to the TB.

Example Embodiment 7

The computer-implemented method of example embodiment 1, wherein the indication comprises an indication indicating that a subset of a pool of HARQ process IDs are common across at least the first and second network resources, wherein the first HARQ process ID and the second HARQ process ID are the same and belong to the subset to indicate that the first and second HARQ process IDs map to the TB.

Example Embodiment 8

The computer-implemented method of example embodiment 1.38, wherein the indication comprises an indication indicating that a subset of a pool of HARQ process IDs are common across a subset of a set of network resources, wherein the first and second HARQ process IDs are the same and belong to the subset of the pool and the first and second network resources belong to the subset of the set of network resources to indicate that the first and second HARQ process IDs map to the TB.

Example Embodiment 9

The computer-implemented method of example embodiment 1, wherein the indication comprises a field in the second assignment indicating that the second assignment is in respect of a retransmission of the TB.

Example Embodiment 10

The computer-implemented method of example embodiment 9, wherein the indication comprises a semi-static configuration that associates the second HARQ process ID with the first HARQ process ID, such that the first assignment including the first HARQ process ID, the second assignment including the second HARQ process ID, and the field in the second assignment together indicate that the first and second HARQ process IDs map to the TB.

Example Embodiment 11

The computer-implemented method of example embodiment 9, wherein for the first assignment and the second assignment to be in respect of the same TB, the first assignment and the second assignment are sent within a specified time window of one another.

Example Embodiment 12

The computer-implemented method of example embodiment 11, wherein the specified time window is specified in terms of a number of time slots, mini-slots, subframes, or symbols.

Example Embodiment 13

The computer-implemented method of example embodiment 1, wherein the indication comprises a first field in the first assignment indicating that there will be an assignment in respect to the TB on a different network resource, and a second field in the second assignment indicating that the second assignment is in respect to the TB transported on the different network resource.

Example Embodiment 14

The computer-implemented method of example embodiment 13, wherein the indication further comprises at least one semi-statically configured mapping rule that associates the first HARQ process ID on the first network resource with the second HARQ process ID on the second network resource, and wherein the first assignment including the first field and the second assignment including the second field together indicate that the first and second assignments are in respect to the TB only when the first HARQ process ID is associated with the second HARQ process ID through the at least one mapping rule.

Example Embodiment 15

The computer-implemented method of example embodiment 1, wherein communicating a transmission associated with at least one of the first HARQ process ID or the second HARQ process ID comprises communicating a first transmission associated with the first HARQ process ID on the first network resource and communicating a second transmission associated with the second HARQ process ID on the second network resource.

Example Embodiment 16

The computer-implemented method of example embodiment 15, further comprising processing, by the access node, the first transmission to produce a first set of LLRs, processing, by the access node, the second transmission to produce a second set of LLRs, combining, by the access node, the first set of LLRs and the second set of LLRs to produce a combined set of LLRs, and decoding, by the access node, the TB transmitted in the first transmission and the second transmission in accordance with the combined set of LLRs.

Example Embodiment 17

The computer-implemented method of example embodiment 1, further comprising sending a HARQ codebook configuration indicating ACK/NACK resources used for transmitting a first ACK/NACK in respect to the TB or versions of the TB received over multiple network resources.

Example Embodiment 18

The computer-implemented method of example embodiment 16, wherein the HARQ codebook configuration indicates an ACK/NACK resource for transmitting a second ACK/NACK in respect to the TB or versions of the TB received over multiple network resources.

Example Embodiment 19

The computer-implemented method of example embodiment 1, further comprising transmitting, by the access node, a third ACK/NACK only on the first network resource.

Example Embodiment 20

The computer-implemented method of example embodiment 1, further comprising transmitting, by the access node, a fourth ACK/NACK on the first network resource and the second network resource.

Example Embodiment 21

The computer-implemented method of example embodiment 1, wherein the first network resource is an unlicensed network resource.

Example Embodiment 22

The computer-implemented method of example embodiment 21, wherein the indication comprises at least one parameter upon which the access node determines whether a switch from the first HARQ process ID on the first network resource to the second HARQ process ID on the second network resource has occurred.

Example Embodiment 23

The computer-implemented method of example embodiment 21, wherein the first assignment comprises a first TB size indicator indicating a size of the first TB and a first NDI, wherein the second assignment comprises a second indicator indicating the size of the second TB a second NDI, wherein the first assignment and the second assignment indicate the same TB size, and wherein the first NDI and the second NDI are the same.

Example Embodiment 24

The computer-implemented method of example embodiment 21, wherein the second assignment comprises an indicator indicating at least one of an identifier of the first network resource or the first HARQ process ID.

Example Embodiment 25

The computer-implemented method of example embodiment 22, wherein the at least one parameter comprises a timeout value of a timer initialized by the access node after a HARQ RTT timer elapses from a last transmission in respect to the TB on the first network resource, such that the timer elapsing indicates a subsequent transmission in respect to the TB will occur on a different network resource.

Example Embodiment 26

The computer-implemented method of example embodiment 25, wherein the RTT timer elapsing further indicates to the access node to send the second assignment for the transmission of the TB with the second HARQ process ID in the second network resource.

Example Embodiment 27

The computer-implemented method of example embodiment 21, wherein the indication further comprises a semi-statically configured association between the first HARQ process ID and the second HARQ process ID.

Example Embodiment 28

The computer-implemented method of example embodiment 21, wherein the indication further comprises at least one mapping, rule, or parameter in respect to a rule that associates the second HARQ process ID with the first HARQ process ID.

Example Embodiment 29

The computer-implemented method of example embodiment 27, wherein the indication comprises an index offset indicating a binary index offset between the first and second HARQ process IDs.

Example Embodiment 30

The computer-implemented method of example embodiment 27, wherein the indication comprises a number of binary shifts between the first and second HARQ process IDs.

Example Embodiment 31

The computer-implemented method of example embodiment 27, wherein the indication comprises an index indicating a binary offset and a number of binary shifts that together associate the second HARQ process ID with the first HARQ process ID.

Example Embodiment 32

The computer-implemented method of example embodiment 27, wherein the indication comprises an index indicating a number of binary shifts, and wherein a binary offset and the number of binary shifts together associate the second HARQ process ID with the first HARQ process ID.

Example Embodiment 33

The computer-implemented method of example embodiment 27, wherein the indication comprises an index indicating a binary offset and a number of binary shifts that together with a semi-statically configured rule or formula associate the second HARQ process ID with the first HARQ process ID.

Example Embodiment 34

A computer-implemented method comprising sending, by an access node, a first assignment for a first transmission with a first HARQ process identifier (process ID) in a first network resource, sending, by the access node, a second assignment for a second transmission with a second HARQ process ID in a second network resource, wherein the first HARQ process ID differs from the second HARQ process ID, detecting, by the access node, an indication indicating that the first HARQ process ID and the second HARQ process ID map to a same TB, and communicating, by the access node, with a UE, a transmission associated with at least one of the first HARQ process ID or the second HARQ process ID.

Example Embodiment 35

An access node comprising a non-transitory memory storage comprising instructions, and one or more processors in communication with the memory storage, wherein the one or more processors execute the instruction to send a first assignment for a first transmission with a first HARQ process identifier (process ID) in a first network resource, send a second assignment for a second transmission with a second HARQ process ID in a second network resource, wherein the first network resource and the second network resource differ in a domain other than a time domain, detect an indication indicating that the first HARQ process ID and the second HARQ process ID map to a same TB, and communicate with a UE, a transmission associated with at least one of the first HARQ process ID or the second HARQ process ID.

Example Embodiment 36

An access node comprising a non-transitory memory storage comprising instructions, and one or more processors in communication with the memory storage, wherein the one or more processors execute the instruction to sending a first assignment for a first transmission with a first HARQ process identifier (process ID) in a first network resource, send a second assignment for a second transmission with a second HARQ process ID in a second network resource, wherein the first HARQ process ID differs from the second HARQ process ID, detect an indication indicating that the first HARQ process ID and the second HARQ process ID map to a same TB, and communicate, with a UE, a transmission associated with at least one of the first HARQ process ID or the second HARQ process ID.

Example Embodiment 37

A computer-implemented method comprising receiving, by a UE, a first assignment for a first transmission with a first HARQ process identifier (process ID) in a first network resource, receiving, by the UE, a second assignment for a second transmission with a second HARQ process ID in a second network resource, wherein the first network resource and the second network resource differ in a domain other than a time domain, detecting, by the UE, an indication indicating that the first HARQ process ID and the second HARQ process ID map to a same TB, and communicating, by the UE, with an access node, a transmission associated with at least one of the first HARQ process ID or the second HARQ process ID.

Example Embodiment 38

The computer-implemented method of example embodiment 37, wherein the indication comprises an indication indicating that a subset of a pool of HARQ process IDs are common across at least the first and second network resources, wherein the first HARQ process ID and the second HARQ process ID are the same and belong to the subset to indicate that the first and second HARQ process IDs map to the TB.

Example Embodiment 39

The computer-implemented method of example embodiment 37, wherein the indication comprises an indication indicating that a subset of a pool of HARQ process IDs are common across a subset of a set of network resources, wherein the first and second HARQ process IDs are the same and belong to the subset of the pool and the first and second network resources belong to the subset of the set of network resources to indicate that the first and second HARQ process IDs map to the TB.

Example Embodiment 40

The computer-implemented method of example embodiment 37, wherein the indication comprises a field in the second assignment indicating that the second assignment is in respect of a retransmission of the TB.

Example Embodiment 41

The computer-implemented method of example embodiment 40, wherein for the first assignment and the second assignment to be in respect of the same TB, the first assignment and the second assignment are received within a specified time window of one another.

Example Embodiment 42

The computer-implemented method of example embodiment 41, wherein the specified time window is specified in terms of a number of time slots, mini-slots, subframes, or symbols.

Example Embodiment 43

The computer-implemented method of example embodiment 37, wherein communicating a transmission associated with at least one of the first HARQ process ID or the second HARQ process ID comprises receiving a first transmission associated with the first HARQ process ID on the first network resource and receiving a second transmission associated with the second HARQ process ID on the second network resource.

Example Embodiment 44

The computer-implemented method of example embodiment 43, further comprising processing, by the UE, the first transmission to produce a first set of LLRs, processing, by the UE, the second transmission to produce a second set of LLRs, combining, by the UE, the first set of LLRs and the second set of LLRs to produce a combined set of LLRs, and decoding, by the UE, the TB transmitted in the first transmission and the second transmission in accordance with the combined set of LLRs.

Example Embodiment 45

The computer-implemented method of example embodiment 37, further comprising transmitting, by the UE, ACK/NACK feedback only on the first network resource.

Example Embodiment 46

The computer-implemented method of example embodiment 45, further comprising receiving a HARQ codebook configuration indicating ACK/NACK resources used for transmitting an ACK/NACK in respect to the TB or versions of the TB received over multiple network resources.

Figure 17:
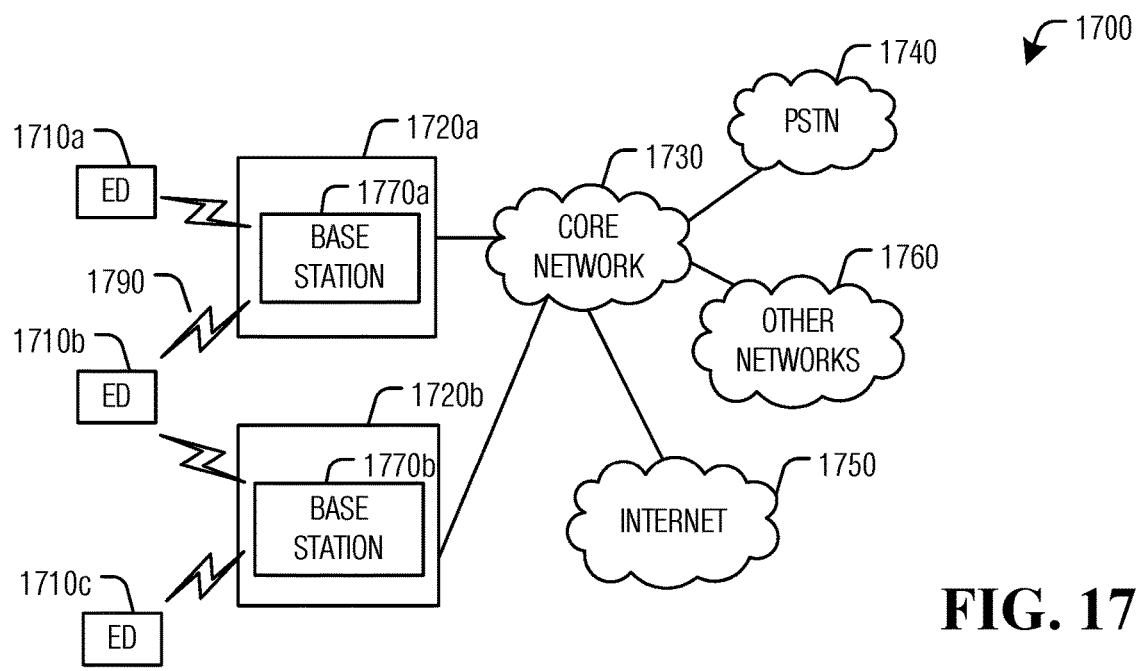
FIG. 17 illustrates an example communication system.

FIG. 17 illustrates an example communication system 1700. In general, the system 1700 enables multiple wireless or wired users to transmit and receive data and other content. The system 1700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1700 includes electronic devices (ED) 1710a-1710c, radio access networks (RANs) 1720a-1720b, a core network 1730, a public switched telephone network (PSTN) 1740, the Internet 1750, and other networks 1760. While certain numbers of these components or elements are shown in FIG. 17, any number of these components or elements may be included in the system 1700.

The EDs 1710a-1710c are configured to operate or communicate in the system 1700. For example, the EDs 1710a-1710c are configured to transmit or receive via wireless or wired communication channels. Each ED 1710a-1710c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1720a-1720b here include base stations 1770a-1770b, respectively. Each base station 1770a-1770b is configured to wirelessly interface with one or more of the EDs 1710a-1710c to enable access to the core network 1730, the PSTN 1740, the Internet 1750, or the other networks 1760. For example, the base stations 1770a-1770b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1710a-1710c are configured to interface and communicate with the Internet 1750 and may access the core network 1730, the PSTN 1740, or the other networks 1760.

In the embodiment shown in FIG. 17, the base station 1770a forms part of the RAN 1720a, which may include other base stations, elements, or devices. Also, the base station 1770b forms part of the RAN 1720b, which may include other base stations, elements, or devices. Each base station 1770a-1770b operates to transmit or receive wireless signals within a particular geographic region or area, sometimes referred to as a "cell." In some embodiments, multiple-input multiple-output (MIMO) technology may be employed having multiple transceivers for each cell.

The base stations 1770a-1770b communicate with one or more of the EDs 1710a-1710c over one or more air interfaces 1790 using wireless communication links. The air interfaces 1790 may utilize any suitable radio access technology.

It is contemplated that the system 1700 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1720a-1720b are in communication with the core network 1730 to provide the EDs 1710a-1710c with voice, data, application, Voice over Internet Protocol (VoIP), or other services. Understandably, the RANs 1720a-1720b or the core network 1730 may be in direct or indirect communication with one or more other RANs (not shown). The core network 1730 may also serve as a gateway access for other networks (such as the PSTN 1740, the Internet 1750, and the other networks 1760). In addition, some or all of the EDs 1710a-1710c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1750.

Although FIG. 17 illustrates one example of a communication system, various changes may be made to FIG. 17. For example, the communication system 1700 could include any number of EDs, base stations, networks, or other components in any suitable configuration.

Figure 18A:
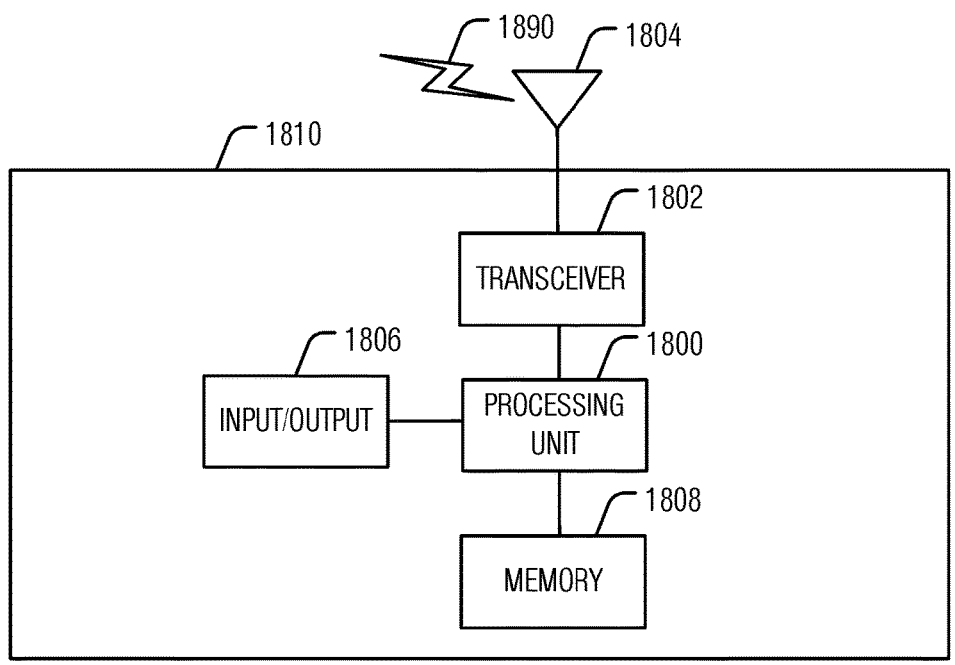
FIGS. 18A and 18B illustrate example devices that may implement the methods and teachings according to this disclosure.
Figure 18B:
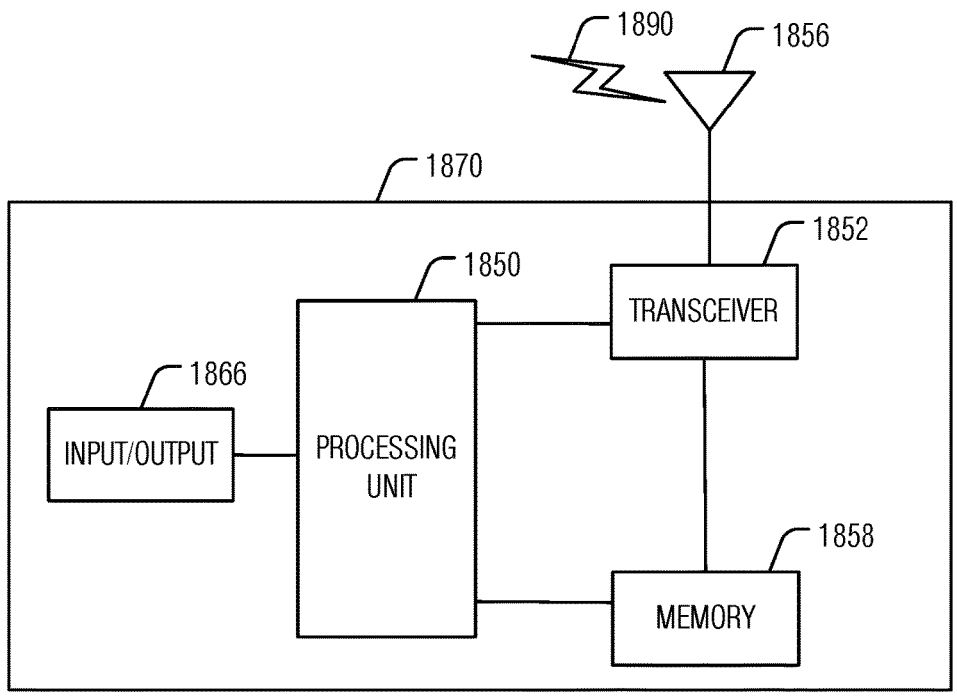

FIGS. 18A and 18B illustrate example devices that may implement the methods and teachings according to this disclosure. In particular, FIG. 18A illustrates an example ED 1810, and FIG. 18B illustrates an example base station 1870. These components could be used in the system 1700 or in any other suitable system.

As shown in FIG. 18A, the ED 1810 includes at least one processing unit 1800. The processing unit 1800 implements various processing operations of the ED 1810. For example, the processing unit 1800 could perform signal coding, data processing, power control, input/output processing, or any other functionality enabling the ED 1810 to operate in the system 1700. The processing unit 1800 also supports the methods and teachings described in more detail above. Each processing unit 1800 includes any suitable processing or computing device configured to perform one or more operations. Each processing unit 1800 could, for example, include a microprocessor, microcontroller, digital signal processor, field programmable gate array, or application specific integrated circuit.

The ED 1810 also includes at least one transceiver 1802. The transceiver 1802 is configured to modulate data or other content for transmission by at least one antenna or NIC (Network Interface Controller) 1804. The transceiver 1802 is also configured to demodulate data or other content received by the at least one antenna 1804. Each transceiver 1802 includes any suitable structure for generating signals for wireless or wired transmission or processing signals received wirelessly or by wire. Each antenna 1804 includes any suitable structure for transmitting or receiving wireless or wired signals. One or multiple transceivers 1802 could be used in the ED 1810, and one or multiple antennas 1804 could be used in the ED 1810. Although shown as a single functional unit, a transceiver 1802 could also be implemented using at least one transmitter and at least one separate receiver.

The ED 1810 further includes one or more input/output devices 1806 or interfaces (such as a wired interface to the Internet 1750). The input/output devices 1806 facilitate interaction with a user or other devices (network communications) in the network. Each input/output device 1806 includes any suitable structure for providing information to or receiving information from a user, such as a speaker, microphone, keypad, keyboard, display, or touch screen, including network interface communications.

In addition, the ED 1810 includes at least one memory 1808. The memory 1808 stores instructions and data used, generated, or collected by the ED 1810. For example, the memory 1808 could store software or firmware instructions executed by the processing unit(s) 1800 and data used to reduce or eliminate interference in incoming signals. Each memory 1808 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 18B, the base station 1870 includes at least one processing unit 1850, at least one transceiver 1852, which includes functionality for a transmitter and a receiver, one or more antennas 1856, at least one memory 1858, and one or more input/output devices or interfaces 1866. A scheduler, which would be understood by one skilled in the art, is coupled to the processing unit 1850. The scheduler could be included within or operated separately from the base station 1870. The processing unit 1850 implements various processing operations of the base station 1870, such as signal coding, data processing, power control, input/output processing, or any other functionality. The processing unit 1850 can also support the methods and teachings described in more detail above. Each processing unit 1850 includes any suitable processing or computing device configured to perform one or more operations. Each processing unit 1850 could, for example, include a microprocessor, microcontroller, digital signal processor, field programmable gate array, or application specific integrated circuit.

Each transceiver 1852 includes any suitable structure for generating signals for wireless or wired transmission to one or more EDs or other devices. Each transceiver 1852 further includes any suitable structure for processing signals received wirelessly or by wire from one or more EDs or other devices. Although shown combined as a transceiver 1852, a transmitter and a receiver could be separate components. Each antenna 1856 includes any suitable structure for transmitting or receiving wireless or wired signals. While a common antenna 1856 is shown here as being coupled to the transceiver 1852, one or more antennas 1856 could be coupled to the transceiver(s) 1852, allowing separate antennas 1856 to be coupled to the transmitter and the receiver if equipped as separate components. Each memory 1858 includes any suitable volatile or non-volatile storage and retrieval device(s). Each input/output device 1866 facilitates interaction with a user or other devices (network communications) in the network. Each input/output device 1866 includes any suitable structure for providing information to or receiving/providing information from a user, including network interface communications.

Figure 19:
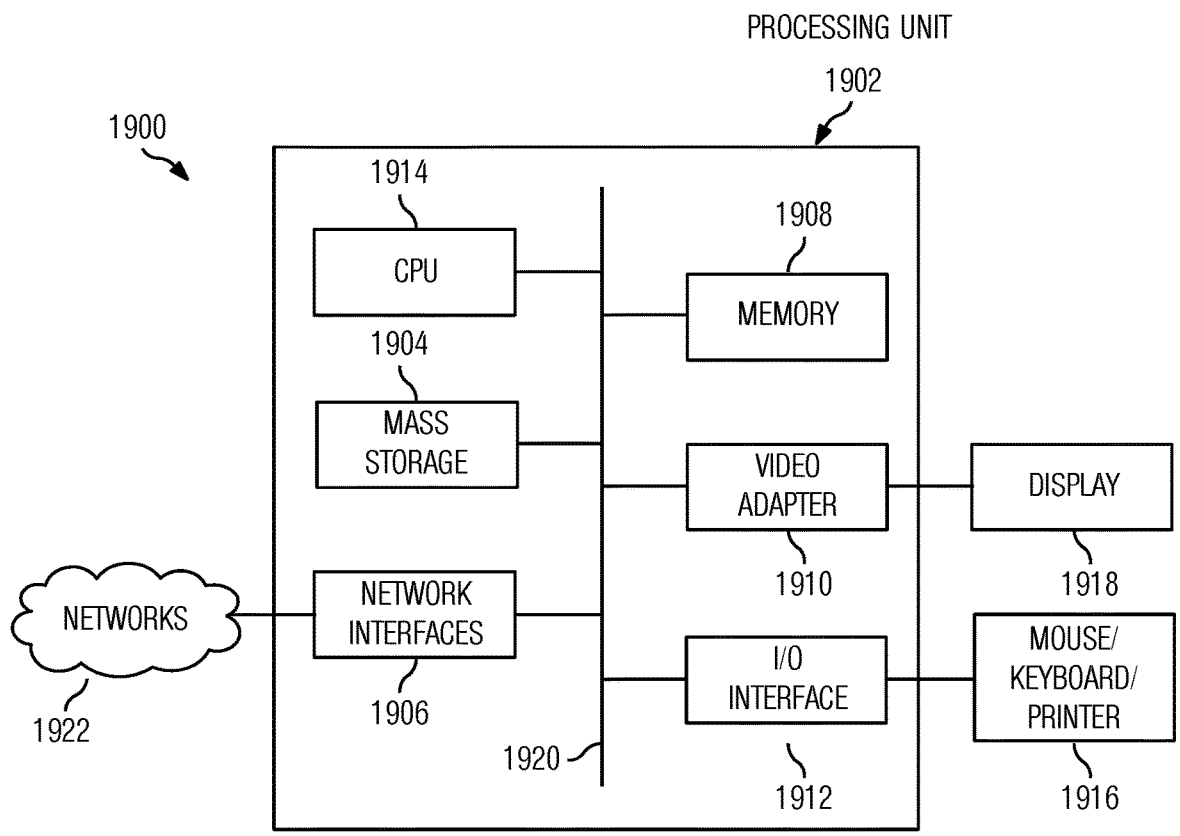
FIG. 19 is a block diagram of a computing system 1900 that may be used for implementing the devices and methods disclosed herein.

FIG. 19 is a block diagram of a computing system 1900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1900 includes a processing unit 1902. The processing unit includes a central processing unit (CPU) 1914, memory 1908, and may further include a mass storage device 1904, a video adapter 1910, and an I/O interface 1912 connected to a bus 1920.

The bus 1920 may be one or more of any type of several bus architectures including a memory bus or memory controller, a peripheral bus, or a video bus. The CPU 1914 may comprise any type of electronic data processor. The memory 1908 may comprise any type of non-transitory system memory such as static random access memory (SRAM), dynamic random access memory (DRAM), synchronous DRAM (SDRAM), read-only memory (ROM), or a combination thereof. In an embodiment, the memory 1908 may include ROM for use at boot-up, and DRAM for program and data storage for use while executing programs.

The mass storage 1904 may comprise any type of non-transitory storage device configured to store data, programs, and other information and to make the data, programs, and other information accessible via the bus 1920. The mass storage 1904 may comprise, for example, one or more of a solid state drive, hard disk drive, a magnetic disk drive, or an optical disk drive.

The video adapter 1910 and the I/O interface 1912 provide interfaces to couple external input and output devices to the processing unit 1902. As illustrated, examples of input and output devices include a display 1918 coupled to the video adapter 1910 and a mouse, keyboard, or printer 1916 coupled to the I/O interface 1912. Other devices may be coupled to the processing unit 1902, and additional or fewer interface cards may be utilized. For example, a serial interface such as Universal Serial Bus (USB) (not shown) may be used to provide an interface for an external device.

The processing unit 1902 also includes one or more network interfaces 1906, which may comprise wired links, such as an Ethernet cable, or wireless links to access nodes or different networks. The network interfaces 1906 allow the processing unit 1902 to communicate with remote units via the networks. For example, the network interfaces 1906 may provide wireless communication via one or more transmitters/transmit antennas and one or more receivers/receive antennas. In an embodiment, the processing unit 1902 is coupled to a local-area network 1922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a detecting unit or module, a communicating unit or module, a processing unit or module, a decoding unit or module, or a combining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method comprising:
receiving, by a user equipment (UE), a first assignment for a first transmission with a first hybrid automatic repeat request (HARQ) process identifier (ID) in a first network resource;
receiving, by the UE, a second assignment for a second transmission with a second HARQ process ID in a second network resource,
wherein the first network resource and the second network resource are associated with different transmission/receiving points (TRPs) of an access node,
wherein the first HARQ process ID is assigned for a first serving cell and the second HARQ process ID is assigned for a second serving cell, and
wherein the second serving cell is different from the first serving cell, a second HARQ process associated with the second HARQ process ID being different from a first HARQ process associated with the first HARQ process ID, the UE receiving the first assignment and the second assignment in two different downlink control informations (DCIs), or wherein the second serving cell is the same as the first serving cell, the second HARQ process ID and the first HARQ process ID being a same HARQ process ID, the UE receiving the first assignment and the second assignment in a single DCI;
detecting, by the UE, an indication including a semi-static configuration that associates the second HARQ process ID with the first HARQ process ID to indicate that the first transmission and the second transmission map to a same transport block (TB); and
communicating, by the UE, with the access node, at least one transmission of the first transmission and the second transmission in at least one respective network resource of the first network resource and the second network resource.

2. The method of claim 1, wherein the communicating the at least one transmission comprises:
receiving, by the UE, the at least one transmission from the access node.

3. The method of claim 1, wherein the communicating the at least one transmission comprises:
transmitting, by the UE, the at least one transmission to the access node.

4. The method of claim 1, wherein the first network resource and the second network resource include at least one of a frequency resource, a time-frequency resource, a code resource, a spatial resource, a carrier, a component carrier, or a bandwidth part (BWP).

5. The method of claim 1, wherein the indication is the semi-static configuration.

6. The method of claim 1, wherein the indication is a combination of the semi-static configuration and dynamic signaling.

7. The method of claim 1, wherein the second serving cell is different from the first serving cell, and wherein the indication comprises:
an indication indicating that a pool of HARQ process IDs is common across at least the first and second network resources, wherein the first HARQ process ID and the second HARQ process ID are the same to indicate that the first HARQ process ID and the second HARQ process ID map to the same TB.

8. The method of claim 1, wherein the indication comprises:
a field in the second assignment indicating that the second assignment is in respect of a retransmission of the TB.

9. The method of claim 8, wherein the second serving cell is different from the first serving cell, and wherein
the first assignment including the first HARQ process ID, the second assignment including the second HARQ process ID, and the field in the second assignment together indicate that the first HARQ process ID and the second HARQ process ID map to the same TB.

10. The method of claim 8, wherein the second serving cell is different from the first serving cell, and wherein for the first assignment and the second assignment to be in respect of the same TB, the first assignment and the second assignment are received within a specified time window of one another.

11. The method of claim 1, wherein the second serving cell is different from the first serving cell, and wherein the indication comprises:
a first field in the first assignment indicating that there will be an assignment in respect to the TB on a different network resource; and
a second field in the second assignment indicating that the second assignment is in respect to the TB transported on the different network resource.

12. The method of claim 11, wherein the indication further comprises at least one semi-statically configured mapping rule that associates the first HARQ process ID on the first network resource with the second HARQ process ID on the second network resource, and wherein the first assignment including the first field and the second assignment including the second field together indicate that the first and second assignments are in respect to the TB only when the first HARQ process ID is associated with the second HARQ process ID through the at least one semi-statically configured mapping rule.

13. The method of claim 1, further comprising receiving a HARQ codebook configuration indicating q acknowledgement/negative acknowledgment (ACK/NACK) resources used for transmitting an ACK/NACK in respect to the TB or versions of the TB received over multiple network resources.

14. The method of claim 13, wherein the HARQ codebook configuration indicates an ACK/NACK resource for transmitting the ACK/NACK in respect to the TB or the versions of the TB received over the multiple network resources.

15. The method of claim 1, further comprising transmitting, by the UE, ACK/NACK feedback on the first network resource and the second network resource.

16. The method of claim 1, wherein the first network resource is an unlicensed network resource.

17. The method of claim 16, wherein the second serving cell is different from the first serving cell, and wherein the indication comprises at least one parameter upon which the UE determines whether a switch from the first HARQ process ID on the first network resource to the second HARQ process ID on the second network resource has occurred.

18. The method of claim 16, wherein the second serving cell is different from the first serving cell, and wherein the first assignment comprises a first TB size indicator indicating a size of a first TB and a first new data indicator (NDI), wherein the second assignment comprises a second indicator indicating the size of a second TB and a second NDI, wherein the first assignment and the second assignment indicate the same TB size, and wherein the first NDI and the second NDI are the same.

19. The method of claim 16, wherein the second assignment comprises an indicator indicating at least one of an identifier of the first network resource or the first HARQ process ID.

20. The method of claim 17, wherein the at least one parameter comprises a timeout value of a timer initialized by the UE after a HARQ round trip time (RTT) timer elapses from a last transmission in respect to the TB on the first network resource, such that the timer elapsing indicates a subsequent transmission in respect to the TB will occur on a different network resource.

21. The method of claim 20, wherein the HARQ RTF timer elapsing further indicates to the UE to trigger the access node to send the second assignment for the second transmission of the TB with the second HARQ process ID in the second network resource.

22. The method of claim 16, wherein the second serving cell is different from the first serving cell, and wherein the indication further comprises at least one mapping, rule, or parameter in respect to a rule that associates the second HARQ process ID with the first HARQ process ID.

23. The method of claim 16, wherein the second serving cell is different from the first serving cell, and wherein the indication further comprises a semi-statically configured association between the first HARQ process ID and the second HARQ process ID.

24. The method of claim 23, wherein the indication comprises an index offset indicating a binary index offset between the first and second HARQ process IDs.

25. The method of claim 23, wherein the indication comprises a number of binary shifts between the first and second HARQ process IDs.

26. The method of claim 23, wherein the indication comprises an index indicating a binary offset and a number of binary shifts that together associate the second HARQ process ID with the first HARQ process ID.

27. The method of claim 23, wherein the indication comprises an index indicating a number of binary shifts, and wherein a binary offset and the number of binary shifts together associate the second HARQ process ID with the first HARQ process ID.

28. The method of claim 23, wherein the indication comprises an index indicating a binary offset and a number of binary shifts that together with a semi-statically configured rule or formula associate the second HARQ process ID with the first HARQ process ID.

29. A user equipment (UE) comprising:
a non-transitory memory storage comprising instructions; and
one or more processors in communication with the non-transitory memory storage, wherein the one or more processors execute the instructions to cause the UE to:
receive a first assignment for a first transmission with a first hybrid automatic repeat request (HARQ) process identifier (ID) in a first network resource;
receive a second assignment for a second transmission with a second HARQ process ID in a second network resource,
wherein the first network resource and the second network resource are associated with different transmission/receiving points (TRPs),
wherein the first HARQ process ID is assigned for a first serving cell and the second HARQ process ID is assigned for a second serving cell, and
wherein the second serving cell is different from the first serving cell, a second HARQ process associated with the second HARQ process ID being different from a first HARQ process associated with the first HARQ process ID, the UE receiving the first assignment and the second assignment in two different downlink control informations (DCIs), or wherein the second serving cell is the same as the first serving cell, the second HARQ process ID and the first HARQ process ID being a same HARQ process ID, the UE receiving the first assignment and the second assignment in a single DCI;
detect an indication including a semi-static configuration that associates the second HARQ process ID with the first HARQ process ID to indicate that the first transmission and the second transmission map to a same transport block (TB); and
communicate, with an access node, at least one transmission of the first transmission and the second transmission in at least one respective network resource of the first network resource and the second network resource.

30. The UE of claim 29, wherein the instructions to cause the UE to communicate the at least one transmission comprise instructions to cause the UE to:
receive the at least one transmission from the access node.

31. The UE of claim 29, wherein the instructions to cause the UE to communicate the at least one transmission comprise instructions to cause the UE to:
transmit the at least one transmission to the access node.

32. The UE of claim 29, wherein the first network resource and the second network resource include at least one of a frequency resource, a time-frequency resource, a code resource, a spatial resource, a carrier, a component carrier, or a bandwidth part (BWP).

33. The UE of claim 29, wherein the indication is the semi-static configuration.

34. The UE of claim 29, wherein the indication is a combination of the semi-static configuration and dynamic signaling.

* * * * *

UNITED STATES PATENT AND TRADEMARK OFFICE
CERTIFICATE OF CORRECTION

| | |
|---|---|
| PATENT NO. | : 11,711,171 B2 |
| APPLICATION NO. | : 16/231006 |
| DATED | : July 25, 2023 |
| INVENTOR(S) | : Salem et al. |

It is certified that error appears in the above-identified patent and that said Letters Patent is hereby corrected as shown below:

In the Claims

In Column 35, in Claim 21, Line 24, delete "RTF" and insert -- RTT --.

Signed and Sealed this
Third Day of October, 2023

Katherine Kelly Vidal
*Director of the United States Patent and Trademark Office*